(12) United States Patent
Williams

(10) Patent No.: US 9,307,599 B2
(45) Date of Patent: *Apr. 5, 2016

(54) LIGHTING DEVICE

(71) Applicant: LITONICS LIMITED, Knighton, Powys (GB)

(72) Inventor: Nicolas Williams, Powys (GB)

(73) Assignee: LITONICS LIMITED, Knighton, Powys (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,622

(22) Filed: Jun. 2, 2015

(65) Prior Publication Data

US 2015/0296586 A1 Oct. 15, 2015

Related U.S. Application Data

(63) Continuation of application No. 14/009,038, filed as application No. PCT/GB2012/050695 on Mar. 28, 2012, now Pat. No. 9,078,308.

(30) Foreign Application Priority Data

Mar. 31, 2011 (GB) .................................. 1105485.5

(51) Int. Cl.
*H05B 37/00* (2006.01)
*H05B 33/08* (2006.01)
(Continued)

(52) U.S. Cl.
CPC ............. *H05B 33/0845* (2013.01); *F21S 9/024* (2013.01); *H02J 9/065* (2013.01); *H05B 33/089* (2013.01); *H05B 33/0812* (2013.01); *H05B 33/0854* (2013.01); *H05B 37/00* (2013.01); *H05B 37/02* (2013.01);
(Continued)

(58) Field of Classification Search
CPC .......... H05B 33/08; H05B 37/00; H05B 37/02
USPC ............. 315/86, 88, 224, 246, 274, 276, 291, 315/297, 307
See application file for complete search history.

(56) References Cited

U.S. PATENT DOCUMENTS 4,323,820 A 4/1982 Teich
4,454,452 A 6/1984 Feldstein
(Continued)

FOREIGN PATENT DOCUMENTS

DE 20 2010 005 615 U1 11/2004
EP 2 163 808 3/2010
(Continued)

OTHER PUBLICATIONS

International Search Report for International Application No. PCT/GB2012/050695.
(Continued)

*Primary Examiner* — Tung X Le
(74) *Attorney, Agent, or Firm* — Merchant & Gould P.C.

(57) ABSTRACT

In one embodiment of lighting devices and lighting systems, the lighting device has a connection for connecting to a primary power supply and has a secondary power supply, such as a battery. A measuring circuit is operable to measure an impedance of the primary power supply connection and to determine from the measurement if a main power supply has failed, and if so whether to power light sources using power from the secondary power supply.

7 Claims, 12 Drawing Sheets

(51) Int. Cl.
| | |
|---|---|
| *H05B 37/02* | (2006.01) |
| *F21S 9/02* | (2006.01) |
| *H02J 9/06* | (2006.01) |
| *H05B 37/04* | (2006.01) |
| *H05B 37/03* | (2006.01) |
| *F21Y 101/02* | (2006.01) |
| *F21V 3/00* | (2015.01) |
| *F21K 99/00* | (2010.01) |
| *H01R 33/945* | (2006.01) |
| *F21Y 113/02* | (2006.01) |

(52) U.S. Cl.
CPC ........... *H05B 37/0245* (2013.01); *H05B 37/03* (2013.01); *H05B 37/04* (2013.01); *F21K 9/135* (2013.01); *F21V 3/00* (2013.01); *F21Y 2101/02* (2013.01); *F21Y 2113/02* (2013.01); *H01R 33/9453* (2013.01); *Y02B 20/383* (2013.01)

(56) References Cited

U.S. PATENT DOCUMENTS

| | | | |
|---|---|---|---|
| 4,636,910 A * | 1/1987 | Chadwick | 361/103 |
| 4,727,291 A | 2/1988 | Bavaro | |
| 4,977,351 A | 12/1990 | Bavaro et al. | |
| 5,233,273 A | 8/1993 | Waki et al. | |
| 5,451,843 A * | 9/1995 | Kahn | H05B 41/42 315/186 |
| 5,734,229 A | 3/1998 | Bavaro et al. | |
| 6,045,232 A | 4/2000 | Buckmaster | |
| 6,097,108 A | 8/2000 | Tweed | |
| 6,168,282 B1 | 1/2001 | Chien | |
| 6,376,932 B1 | 4/2002 | Yang | |
| 6,380,693 B1 | 4/2002 | Kastl | |
| 6,452,217 B1 | 9/2002 | Wojnarowski et al. | |
| 6,876,159 B1 | 4/2005 | Wu et al. | |
| 7,102,295 B2 | 9/2006 | Chen | |
| 7,952,303 B2 * | 5/2011 | Xiong | H05B 41/295 315/209 R |
| 8,232,746 B2 | 7/2012 | Yufuku et al. | |
| 2003/0006709 A1 | 1/2003 | Tabell | |
| 2003/0141819 A1 | 7/2003 | Cojocary | |
| 2004/0012959 A1 | 1/2004 | Robertson et al. | |
| 2004/0264187 A1 | 12/2004 | Vanderschuit | |
| 2005/0265035 A1 | 12/2005 | Brass et al. | |
| 2006/0193131 A1 | 8/2006 | McGrath et al. | |
| 2007/0189001 A1 | 8/2007 | Nielson et al. | |
| 2007/0200433 A1 | 8/2007 | Kelty | |
| 2007/0247840 A1 | 10/2007 | Ham | |
| 2008/0030140 A1 | 2/2008 | Pape et al. | |
| 2008/0088180 A1 | 4/2008 | Cash et al. | |
| 2008/0175216 A1 | 7/2008 | Nasco | |
| 2008/0203937 A1 | 8/2008 | Hooijer et al. | |
| 2008/0203939 A1 | 8/2008 | Pekarski et al. | |
| 2008/0222431 A1 | 9/2008 | Paniagua et al. | |
| 2008/0304249 A1 | 12/2008 | Davey et al. | |
| 2008/0316755 A1 | 12/2008 | Zheng et al. | |
| 2009/0152952 A1 | 6/2009 | Evans, Sr. | |
| 2009/0161356 A1 | 6/2009 | Negley et al. | |
| 2009/0175041 A1 | 7/2009 | Yuen et al. | |
| 2010/0133578 A1 | 6/2010 | Pickard et al. | |
| 2010/0135000 A1 | 6/2010 | Smith, III et al. | |
| 2010/0176743 A1 | 7/2010 | Lee et al. | |
| 2010/0194277 A1 | 8/2010 | Yoo | |
| 2010/0244719 A1 | 9/2010 | Mans | |
| 2010/0270861 A1 | 10/2010 | Chen | |
| 2010/0327766 A1 | 12/2010 | Recker et al. | |
| 2011/0057572 A1 | 3/2011 | Kit et al. | |
| 2011/0068692 A1 | 3/2011 | Tian et al. | |
| 2011/0128742 A9 | 6/2011 | Yuen et al. | |
| 2011/0163672 A1 | 7/2011 | Shew et al. | |
| 2012/0001548 A1 | 1/2012 | Recker et al. | |
| 2012/0235492 A1 | 9/2012 | Inoue et al. | |
| 2014/0015423 A1 | 1/2014 | Williams | |
| 2015/0091451 A1 | 4/2015 | Williams | |

FOREIGN PATENT DOCUMENTS

| | | |
|---|---|---|
| EP | 2 384 087 | 9/2012 |
| GB | 2 447 495 | 9/2008 |
| GB | 2 455 107 | 6/2009 |
| GB | 2 466 790 | 7/2010 |
| GB | 2 483 113 | 2/2012 |
| GB | 2 489 505 | 10/2012 |
| JP | 8-264010 | 10/1996 |
| JP | 2000-92717 | 3/2000 |
| JP | 2001-176680 | 6/2001 |
| JP | 2002-359087 | 12/2002 |
| WO | WO 01/71244 | 9/2001 |
| WO | WO 2005/045312 | 5/2005 |
| WO | WO 2006/030432 | 3/2006 |
| WO | WO 2006/064209 | 6/2006 |
| WO | WO 2007/004190 | 1/2007 |
| WO | WO 2008/124701 | 10/2008 |
| WO | WO 2009/017329 | 2/2009 |
| WO | WO 2009/067074 | 5/2009 |
| WO | WO 2010/043923 | 4/2010 |
| WO | WO 2010/070676 | 6/2010 |
| WO | WO 2010/090012 | 8/2010 |
| WO | WO 2010/099755 | 9/2010 |
| WO | WO 2010/127366 | 11/2010 |
| WO | WO 2011/014111 | 2/2011 |
| WO | WO 2011/042781 | 4/2011 |
| WO | WO 2012/013168 | 10/2012 |

OTHER PUBLICATIONS

International Search Report for International Application No. PCT/GB2013/051141 mailed Aug. 21, 2013 (2 pages).

International Search Report for International Application No. PCT/GB2012/050693 mailed Sep. 19, 2012 (3 pages).

Panasonic Lithium Ion, Features & Benefits, Version 13.11R1, Copyright 2012, Energy Company, http://industrial.panasonic.com/lecs/www-data/pdf2/ACI4000/ACI4000CE17.pdf , 1 page.

VARTA Rechargeable Lithium-Ion Cylindrical, Data Sheet, Jun. 9, 2010/RH 702507, VARTA Microbattery GmbH, http://www.varta-microbattery.com/applications/mb_data/documents/data_sheets/ds56621.pdf, 1 page.

Samsung SDI, Specification of Product for Lithium-ion Rechargeable Cell, Jan. 2005, Samsung SDI Co., Ltd., Mobile Energy Division, http://www.batteryonestop.com/baotongusa/products/datasheets/li-ion/Samsung-SDI-ICR18650-26A.pdf , 16 pages.

Steve McCluer, Wanted: Real World Battery Life Prediction Abstract, American Power Conversion Corporation (APC), http://www.battcon.com/papersfinal2003/mccluerpaperfinal2003.pdf, 8 pages.

Panasonic Nickel Cadmium Batteries, Technical Handbook '02/'03, PDF File Technical Handbook, Copyright 2002, Matsushita Battery Industrial Co., Ltd., http://media.digikey.com/pdf/Data%20Sheets/Panasonic%20Batteries%20PDFS/Ni%20Cd%20Catalog%202002-03%20v1.pdf , 87 pages.

Energizer Product Data Sheet, Energizer NH15-2300 Specifications, Form No. EBC-7102WB, http://data.energizer.com/PDFs/nh15-2300.pdf , 1 page.

Cree Product Family Data Sheet, Cree XLamp XM-L LEDs, CLD-DS33 REV 10A, Copyright 2010-2015 Cree, Inc., http://www.cree.com/~/media/files/cree/led%20components%20and%20modules/xlamp/data%20and%20binning/xlampxml.pdf 14 pages.

* cited by examiner

LIGHTING DEVICE

This application is a Continuation of U.S. Ser. No. 14/009,038, filed 11 Nov. 2013, which is a National Stage Application of PCT/GB2012/050695, filed 28 Mar. 2012, which claims benefit of Serial No. 1105485.5, filed 31 Mar. 2011 in Great Britain and which applications are incorporated herein by reference. To the extent appropriate, a claim of priority is made to each of the above disclosed applications.

BACKGROUND

The present invention relates to lighting devices and in particular to lighting devices that have additional components and circuitry to enable the lighting device to emit light using electrical energy from a secondary power supply (such as a battery) if the primary power supply (such as a mains supply) is interrupted.

In the event of an electrical power supply failure to a conventional lighting device, the absence of any immediate or sustained ambient light presents numerous safety, welfare, convenience and security concerns to the occupants of any affected public, commercial, industrial or residential buildings and areas. Existing standby or emergency lighting systems typically take the form of a bespoke unit, primarily designed for industrial and commercial environments, which solely function in the event of a power failure (power outage). These existing products typically require dedicated installation, additional wiring and regular maintenance and testing, adding further to purchase and ownership cost. Light is usually only produced in the event of a mains power failure and until either the secondary source is exhausted or primary power is restored, and during that time the user cannot control the light readily, such as to conserve the limited electrical storage capacity when light is not required. Further still, these lighting devices are usually functionally termed "non-maintained" and are only intended to give emergency rather than mainstream illumination when the primary mains power supply is available. Therefore, the associated emergency lighting apparatus is operationally redundant whenever mains power is available and primary lighting is used instead.

Some existing lighting devices are arranged to produce uninterrupted primary illumination from either primary or secondary supplies. These devices are termed "maintained". In antithesis, lighting devices termed "maintained" are generally intended to produce uninterrupted primary illumination sustained from either mains or secondary electrical storage sources. Maintained devices typically have no switch on supply, hence require permanent mains feed, thus light is usually continuous with the battery being used if the permanent mains feed fails.

The above problems can be solved by combining standard and emergency lighting into one unit that may retro-fit any existing non-emergency light fitting or wiring installation and which may replace or augment any conventional lighting devices powered from the mains power supply.

The present inventor has previously proposed (in GB 2447495) an electric lighting device having circuitry that can detect mains failure and which can provide power to the lighting device from a backup battery provided in or close to the lighting device. One important function of this earlier lighting device is that it is able to distinguish between a failure in the mains power supply and a user controlled removal of the power supply at a light switch. As described in the inventor's earlier GB application, this is achieved by evaluating the impedance across the supply terminals. When there is a mains power failure and the light is switched on, the impedance will be low; whereas when the user has switched off the light at a light switch the impedance will be high.

The present application describes a number of improvements to the lighting device described in the inventor's earlier GB application discussed above.

SUMMARY OF INVENTION

According to one aspect, the invention provides a method of controlling a lighting apparatus comprising one or more light sources, a primary input power connection for receiving primary power from a primary power supply, for powering a light source, a secondary input power connection for receiving secondary power from a secondary power supply, for powering a light source, the method comprising: controlling power delivery to the one or more light sources using power received at the input power connections, such that in the event of a power failure, power from the secondary power supply is used for powering a light source; sensing an external impedance connected to the primary input power connection by applying measurement pulses to the primary input power connection to obtain an impedance measure of the external impedance; and wherein the controlling step controls the power delivery in dependence upon the impedance measure.

The sensing may apply the measurement pulses to the primary input power connection and detect transient signals on the primary input power connection, from which a measure indicative of the external impedance connected to the primary input power connection is determined. The measure can then be used to determine if manually operable switches coupled to the primary input power connection are in an open or a closed state. Based on this determination, the method can distinguish between: i) removal of the primary supply from the primary input power connection by a user opening a switch coupled, in use, to the lighting apparatus; and ii) primary supply failure; and, upon detection of primary supply failure, can provide power from the secondary power supply to the light source to provide emergency lighting functionality.

The duration and/or the time period between measurement pulses that are applied to the primary input power connection may be varied. This may be done in dependence upon a charge status of the secondary power supply or, where the lighting apparatus has a plurality of different modes of operation, in dependence upon the time that the lighting device has been in a present mode of operation or in a random or pseudo-random manner.

The method may determine a measurement of the external impedance for a plurality of measurement pulses and may combine two or more of those measurements to determine an average measurement. The method may involve applying measurement voltage pulses and/or measurement current pulses to the primary input supply connection.

The present invention also provides a lighting control apparatus comprising: a primary input power connection for connection to a primary power supply; a secondary input power connection for receiving secondary power from a secondary power supply; and electronic circuitry arranged to control power delivery to one or more lighting devices; wherein the electronic circuitry comprises sensing circuitry configured to sense an external impedance coupled, in use, to the primary input power connection and wherein the sensing circuitry is arranged to apply measurement pulses to the primary input power connection to obtain an impedance measure of the external impedance and wherein the electronic circuitry is arranged to control power delivery to the one or more lighting devices in dependence upon the impedance measure.

The electronic circuitry is arranged to apply the measurement pulses to the primary input power connection and is arranged to detect transient signals on the primary input power connection, from which it determines said impedance measure. The sensing circuit can determine the impedance measure based on a decay rate of the transient signals. The sensing circuit may determine a time period for the transient signals to decay from a first level to a second level and use this as the impedance measure. One or both of the first level and the second level may be system constants or system variables that are dynamically set based on a number of previous measurements obtained by the sensing circuitry.

The electronic circuitry can use the impedance measure to determine if manually operable switches coupled to the primary input power connection are in an open or a closed state.

In one embodiment, the sensing circuitry compares the impedance measure with a threshold value and based on the result of the comparison determines if manually operable switches coupled to the primary input power connection are in an open or a closed state. The threshold may be a system constant or a system variable that is dynamically set based on a number of previous impedance measurements. Based on the determination, the electronic circuitry can distinguish between: i) removal of the primary supply from the primary input power connection by a user opening a switch coupled, in use, to the control apparatus; and ii) primary supply failure; and, upon detection of primary supply failure, the circuitry can control power delivery to the one or more lighting devices using power from a secondary power supply to provide emergency lighting functionality.

The electronic circuitry can vary the duration and/or the time period between measurement pulses that are applied to the primary input power connection. This variation may be in dependence upon a charge status of the secondary power supply; in dependence upon the time that the electronic circuitry has been in a present mode of operation; or in a random or pseudo-random manner.

The electronic circuitry may determine a measurement of the external impedance for each of a plurality of measurement pulses and may combine two or more of those measurements to determine an average measurement.

The sensing circuitry can apply measurement voltage pulses and/or measurement current pulses to the primary input supply connection.

In one embodiment, the electronic circuitry obtains a measurement of a voltage level and/or frequency of a power signal received at the primary input power connection and if the measured voltage level or frequency is within a predefined range, inhibits operation of the sensing circuitry.

The electronic circuitry may have a sleep mode of operation in which the sensing circuitry is inoperative and wherein the electronic circuitry is arranged to wake up from the sleep mode upon application of a power signal to the primary input power connection or upon receipt of an external control signal.

The sensing circuitry may hibernate between measurement pulses.

In one embodiment, a capacitor is coupled to the primary power input connection and the sensing circuitry monitors the charge on the capacitor resulting from the application of the measurement pulse to the primary power input connection. The sensing circuitry can, for example, monitor the way in which the charge accumulates on the capacitor during application of the measurement pulse and from the monitored charge accumulation estimate the number of other electronic devices coupled to the primary input power connection.

The secondary power input connection is for receiving power for the electronic circuitry from a secondary power supply when power is not available at said primary power input connection; and the electronic circuitry can inhibit operation of the sensing circuitry if a remaining charge of the secondary power supply is below a threshold value.

In one embodiment, an isolator is provided that can isolate the electronic circuitry from the primary input power connection.

A power supply unit may be provided that receives primary power from the primary input power connection and which provides a rectified primary power supply for powering the electronic circuitry and further comprising circuitry arranged so that the larger of rectified primary power supply and the secondary power supply is used to provide power to a processor forming part of said electronic circuitry.

The lighting device described above may be provided in a housing adapted for connection in a conventional lighting circuit between supply wiring and a conventional lamp holder.

The conventional lamp holder may be an AC lamp holder and the electronic circuitry may provide an AC output supply obtained from an AC input supply received at the primary input power connection to output connections used to connect to the conventional lamp holder to supply the AC output supply to the conventional lamp holder.

The conventional lamp holder may also be a DC lamp holder and wherein the electronic circuitry may convert an AC supply received at the primary input power connection to output a DC supply on output connections used to connect to said conventional lamp holder to supply said DC supply to said conventional lamp holder.

The electronic circuitry may include an isolator for isolating the output connections when the sensing circuitry is measuring the external impedance.

The electronic circuitry may supply power to a plurality of output connections of the housing to provide power to a plurality of lamp holders and wherein the electronic circuitry may provide, in the event of primary supply failure, power from the secondary power supply to a subset of the output connections.

The control apparatus may send a control signal to the one or more lighting devices to control the delivery of power to the one or more lighting devices. The control apparatus may send the control signal to the one or more lighting devices over a wireless link or over a primary supply line connected, in use, to the primary input power connection.

The invention also provides a lighting device comprising: one or more light sources; and the above control apparatus. The lighting device may include one or more primary light sources for use in providing primary illumination and one or more secondary light sources for providing secondary illumination and may further comprise a sensor for sensing illumination failure of one or more of the primary light sources. The electronic circuitry may switch on one or more of the secondary light sources in the event that the sensor detects illumination failure of one or more of the primary light sources. The electronic circuitry can switch on the one or more secondary light sources until it detects a change in the availability of primary power at the primary input power connection. The sensor may be selected from the group comprising: a load sensor, an impedance sensor and a light sensor.

The present invention also provides a kit comprising: the above control apparatus for generating and transmitting a control signal for controlling the application of power to one or more lighting devices; and one or more lighting devices, each comprising: a primary input power connection for connection to a primary power supply; a secondary input power connection for receiving secondary power from a secondary power supply; and electronic circuitry arranged to receive the control signal from the control apparatus and arranged to control the delivery of power to the one or more light source(s) using power from the primary input power connection or using power from the secondary input power connection in dependence upon the control signal received from the control apparatus.

Another aspect provides a lighting device comprising: one or more light sources; a primary input power connection for receiving primary power from a primary power supply, for powering a light source of the lighting device; a secondary input power connection for receiving secondary power from a secondary power supply, for powering a light source of the lighting device; and electronic circuitry configured to control power delivery to the one or more light sources using power received at one or more of the input power connections; and wherein the electronic circuitry has a primary mode of operation in which primary power is available at the primary input power connection and a secondary mode of operation in which primary power is not available at the primary input power connection, and wherein the electronic circuitry has a plurality of user configurable parameters defining different brightness preferences for the primary operating mode and the secondary operating mode.

The electronic circuitry may vary the brightness of the light generated by the lighting device by varying the power supplied to one or more of the light sources and/or by varying the number of light sources that receive power from the primary and/or secondary supplies.

The electronic circuitry may receive a signal over a wireless communications link or through one or more of the input power connections that defines a desired brightness in each operating mode.

The electronic circuitry may also distinguish between: i) removal of the primary supply from the primary input connection by a user opening a switch coupled, in use, to the lighting device; and ii) primary supply failure; and, upon detection of primary supply failure, may provide power from the secondary power supply to one or more light sources of the lighting device to provide emergency lighting functionality.

The electronic circuitry may comprise a memory, preferably a non-volatile memory, for storing user configured parameters defining a desired brightness of light in each operating mode, so that the desired brightness can be recalled during a subsequent operation in that mode.

Another aspect also provides a lighting device comprising: first and second light sources; a primary input power connection for receiving primary power from a primary power supply, for powering the first light source; a secondary input power connection for receiving secondary power from a secondary power supply, for powering the second light source; and electronic circuitry arranged to control power delivery to the first and second light sources using power received at the input power connections; wherein the electronic circuitry is configured to distinguish between: i) removal of the primary supply from the primary input power connection by a user opening a switch coupled, in use, to the lighting device; and ii) primary supply failure; and, upon detection of primary supply failure, is configured to provide power from the secondary power supply to the second light source to provide emergency lighting functionality; and wherein the electronic circuitry is user configurable so that in a first configuration power from the secondary power supply is only provided upon detection of primary supply failure and so that in a second configuration power from the secondary power supply is provided to the second light source while primary power is supplied to the first light source.

The first light source may be powered by an AC primary power supply and wherein the second light source may be powered by a DC secondary power supply.

The electronic circuitry may receive a data signal over a wireless communications link or through one or more of the input power connections that sets the electronic circuitry in the first or second configurations.

Another aspect provides a lighting device comprising: one or more light sources; a primary input power connection for receiving primary power from a primary power supply, for powering a light source; a secondary input power connection for receiving secondary power from a secondary power supply, for powering a light source; and electronic circuitry coupled to the input power connections and arranged to control power delivery to the one or more light sources using power received at the input power connections; wherein the electronic circuitry comprises sensing circuitry configured to sense an external impedance connected to the primary input power connection and an isolator for isolating the sensing circuitry from other components of the lighting device at least when said sensing circuitry is sensing said external impedance.

The isolator may comprise a semiconductor junction device, such as a zener diode, which isolates the sensing circuitry from other components of the electronic circuitry. The semiconductor junction device may be coupled to the primary input power connection and connected to the sensing circuitry such that the semiconductor junction device is reverse biased when the sensing circuitry is sensing the external impedance connected to the primary input power connection.

The sensing circuitry may apply a measurement voltage to the primary input power connection and the amplitude of the measurement voltage is lower than the breakdown voltage of the semiconductor junction device.

Alternatively, the isolator may comprise a relay device that isolates one or more of said light sources from the sensing circuitry.

These and other aspects of the invention will become apparent from the following description of exemplary embodiments which are described below with reference to the accompanying Figures in which.

Figure 3:
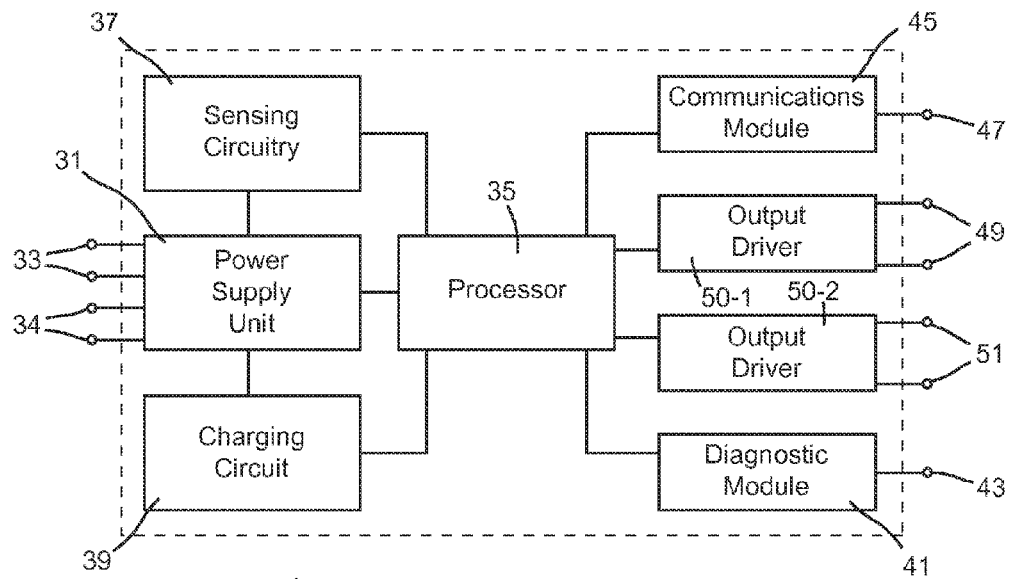
FIG. 3 is a block diagram illustrating the main components of electronic circuitry forming part of the lighting device shown in FIG. 1.
Figure 4:
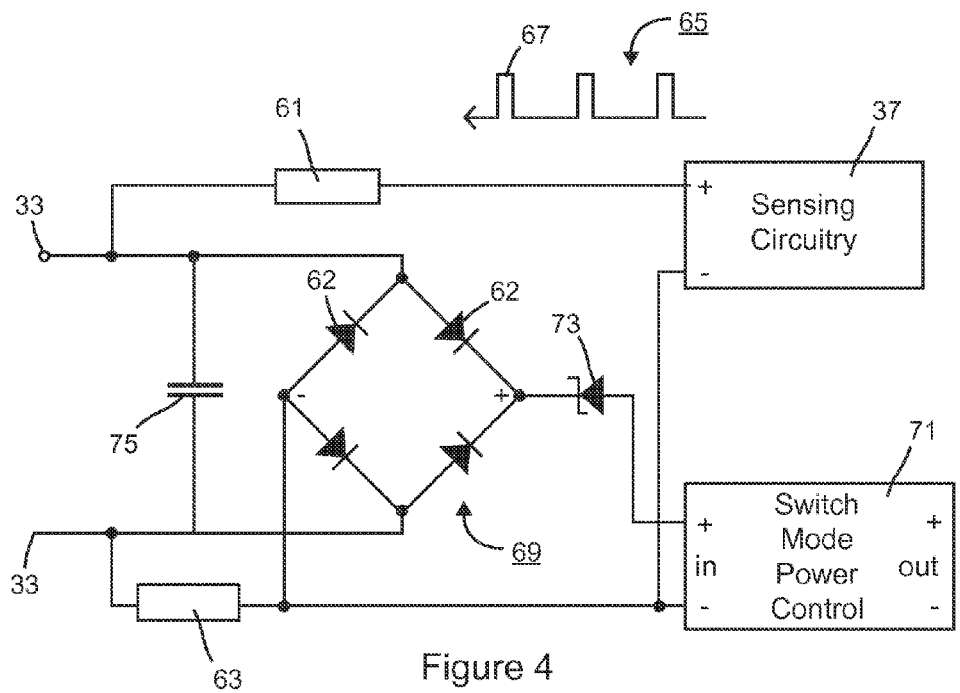
FIG. 4 is a schematic diagram illustrating the electrical connection of a sensing circuit and a switch mode power control unit forming part of the circuitry shown in FIG. 3.
Figure 5A:
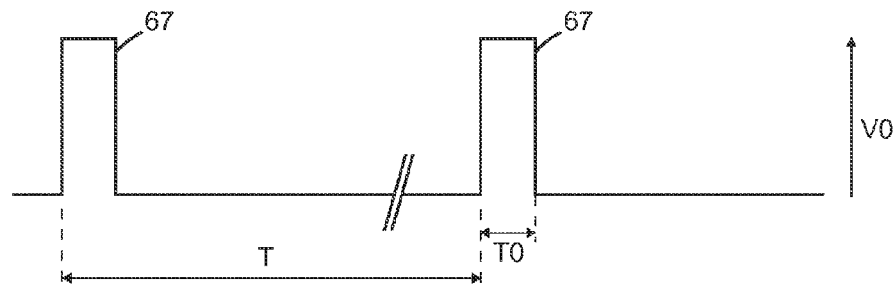
FIG. 5a is a plot illustrating a sequence of voltage pulses generated by the sensing circuitry shown in FIG. 4.
Figure 5B:
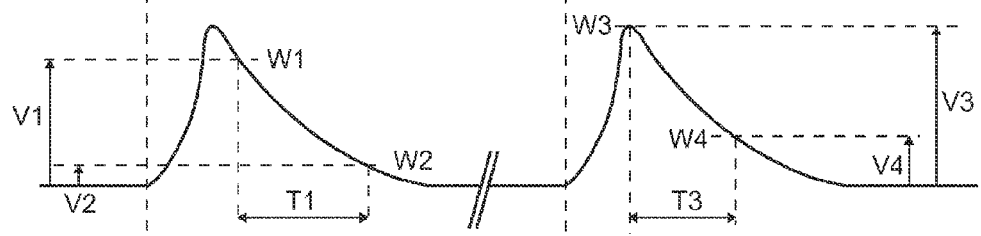
FIG. 5b illustrates a sense signal sensed by the sensing circuitry shown in FIG. 4 obtained when primary power input terminals of the circuitry shown in FIG. 4 are connected to a high impedance.
Figure 5C:
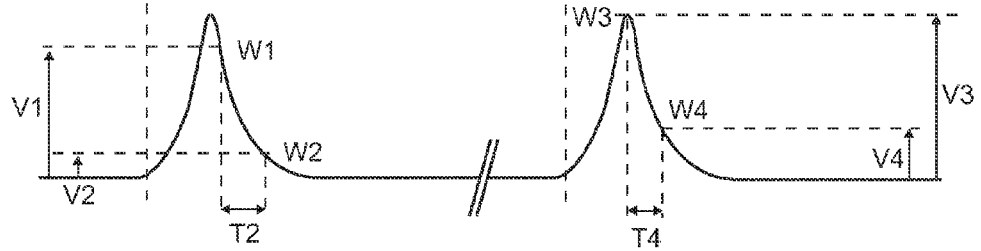
FIG. 5c illustrates a sense signal sensed by the sensing circuitry shown in FIG. 4 obtained when primary power input terminals of the circuitry shown in FIG. 4 are connected to a low impedance load.
Figure 5D:
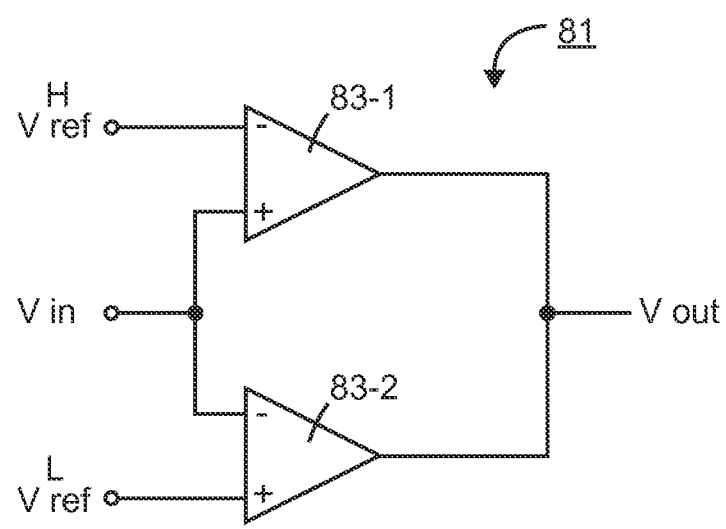
Figure 6:
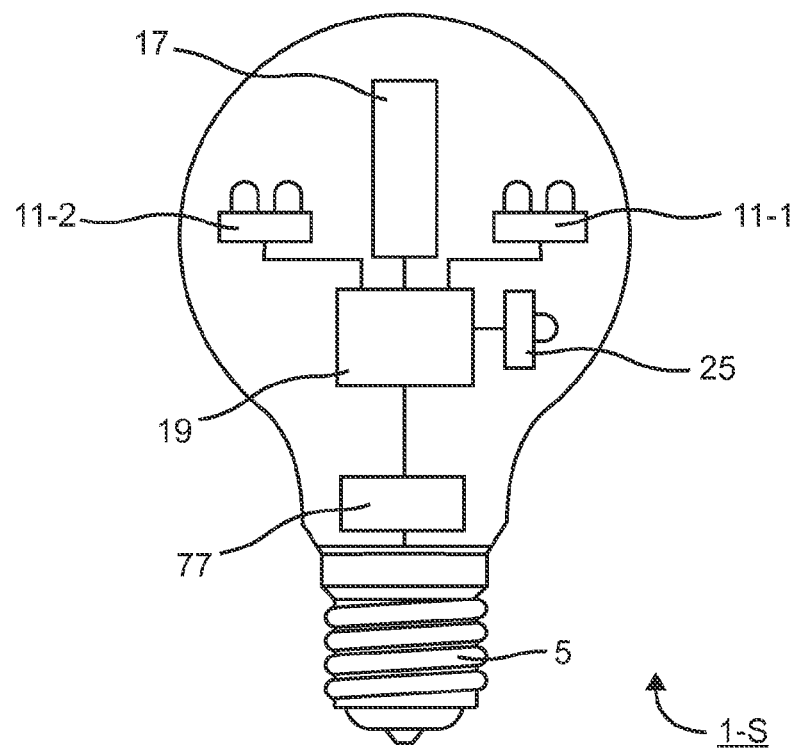
Figure 6:
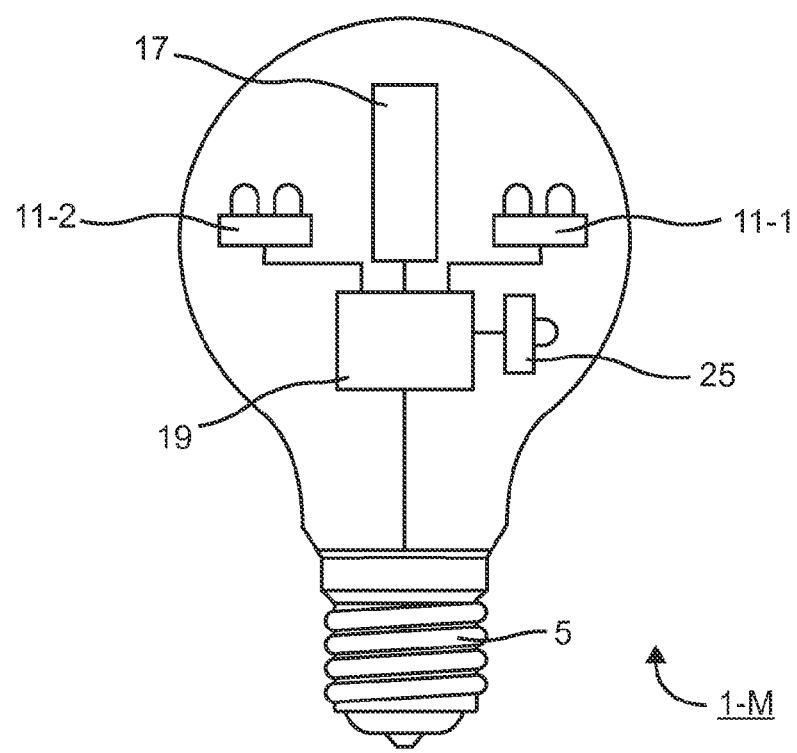
Figure 7:
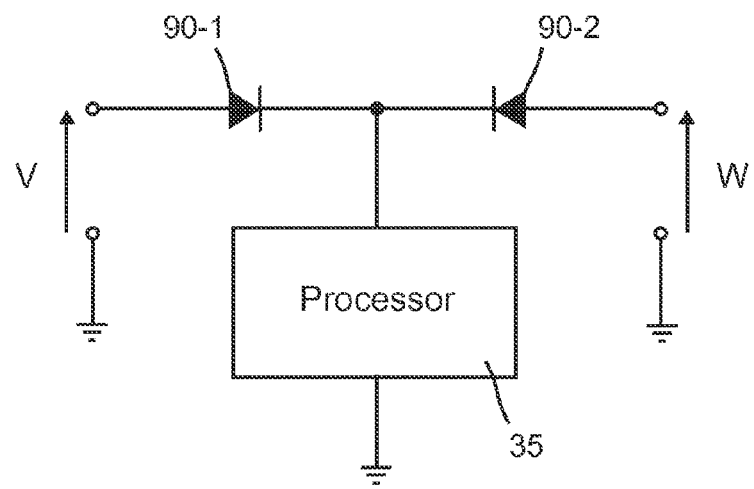
Figure 8:
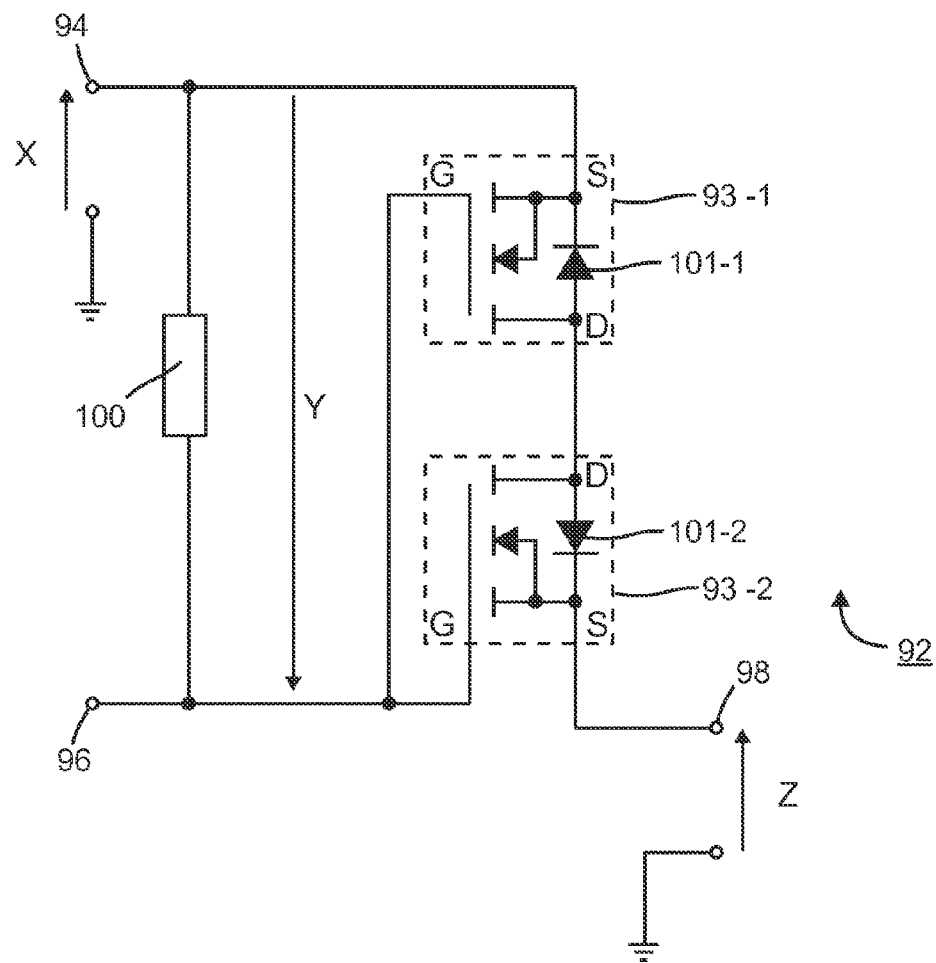

FIG. 5d schematically illustrates the components of a window comparator forming part of the sensing circuitry shown in FIG. 4;

FIG. 6 illustrates the way in which two lighting devices can operate in a master/slave configuration;

FIG. 7 is a circuit diagram illustrating the way in which a processor forming part of the circuitry shown in FIG. 3 may be powered either from a power signal derived from a primary power supply or by a power signal derived from a secondary power supply;

FIG. 8 illustrates a circuit having two back-to-back MOSFET switches used to provide load control between primary and secondary power supplies.

Figure 9A:
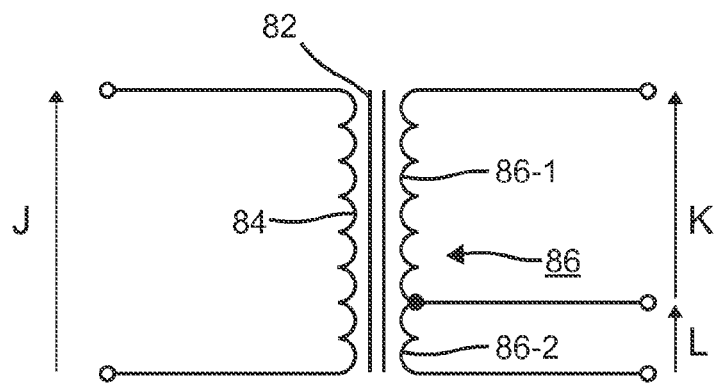
Figure 9B:
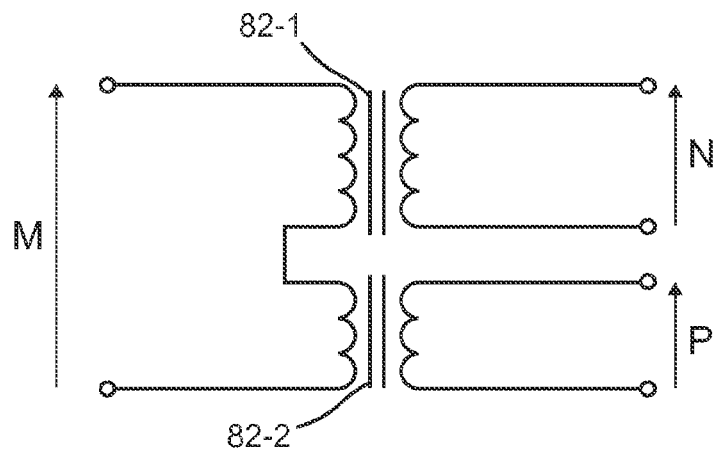
Figure 9C:
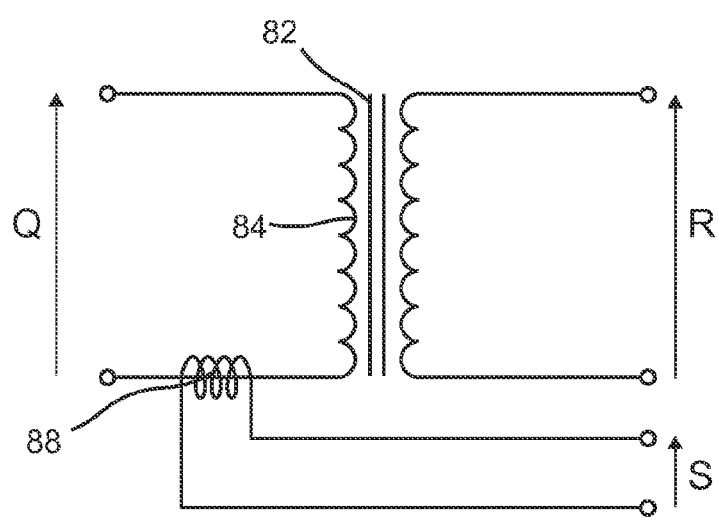
Figure 10:
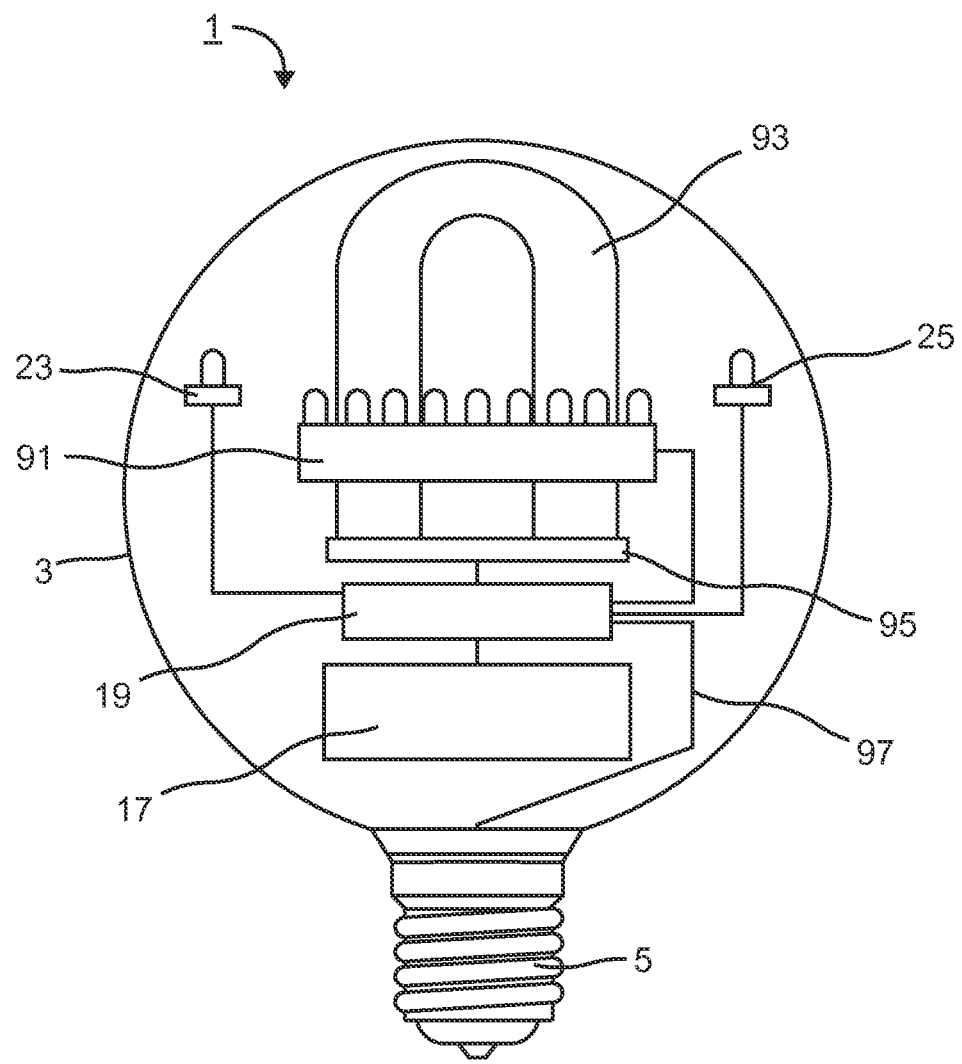
Figure 11A:
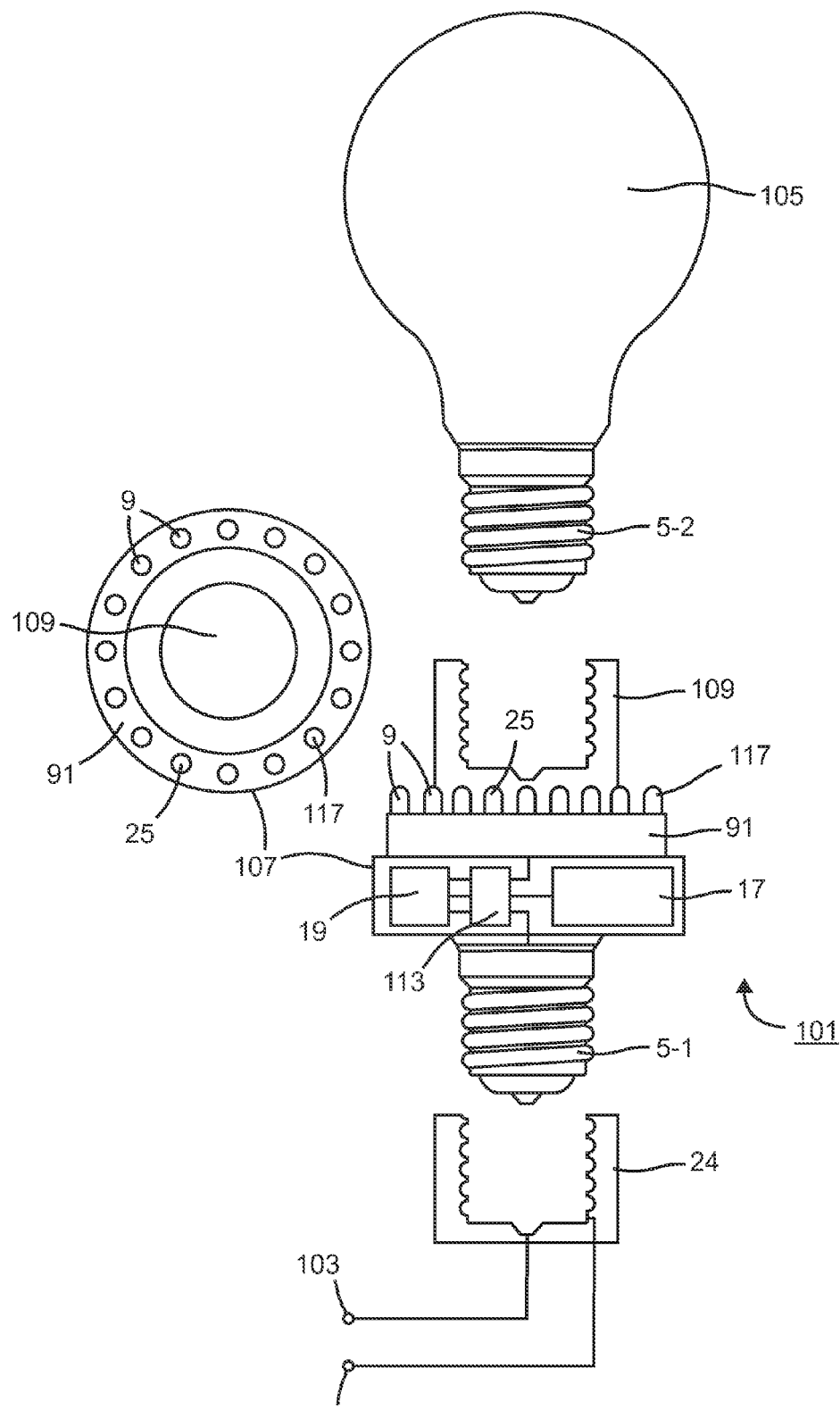
Figure 11B:
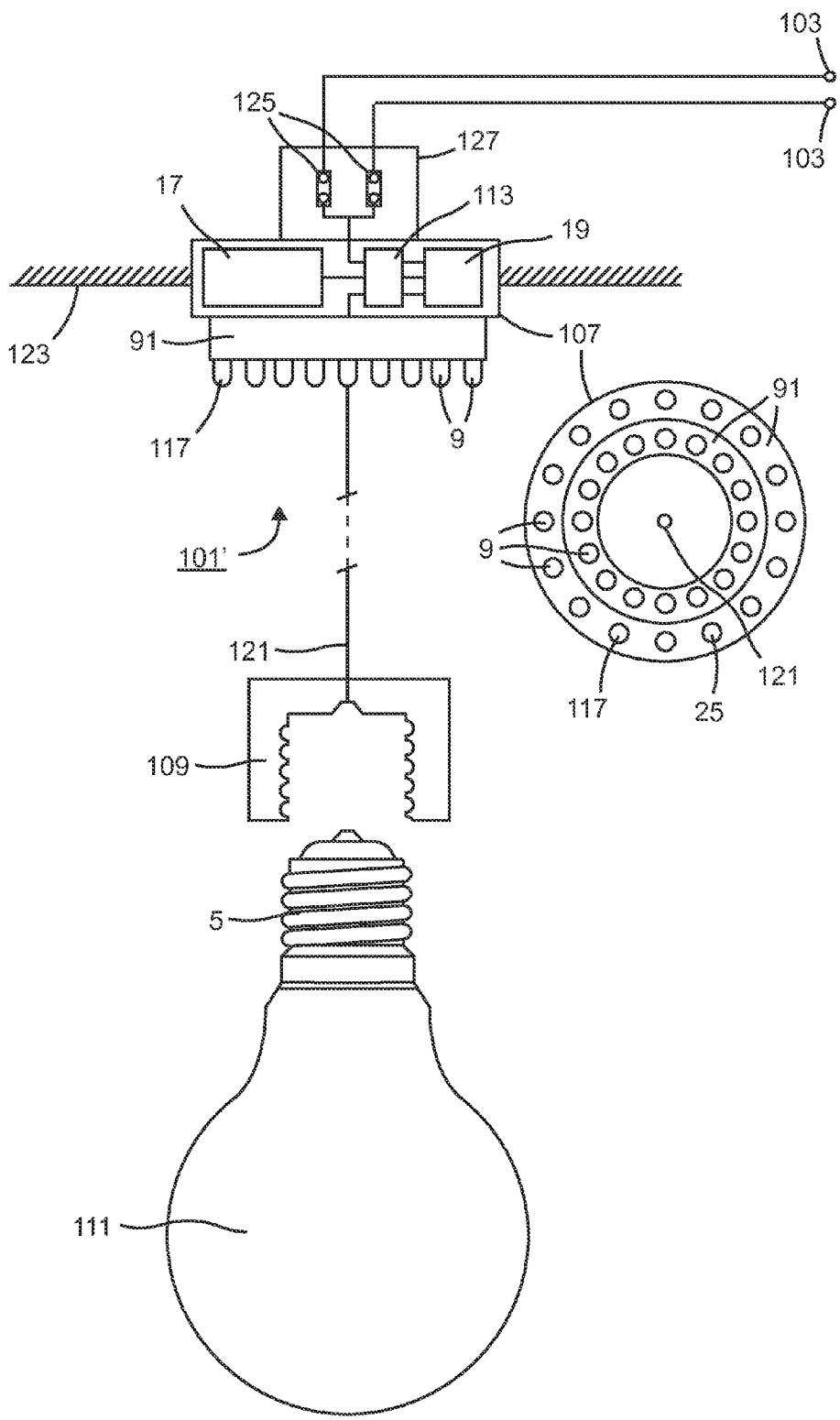
Figure 12:
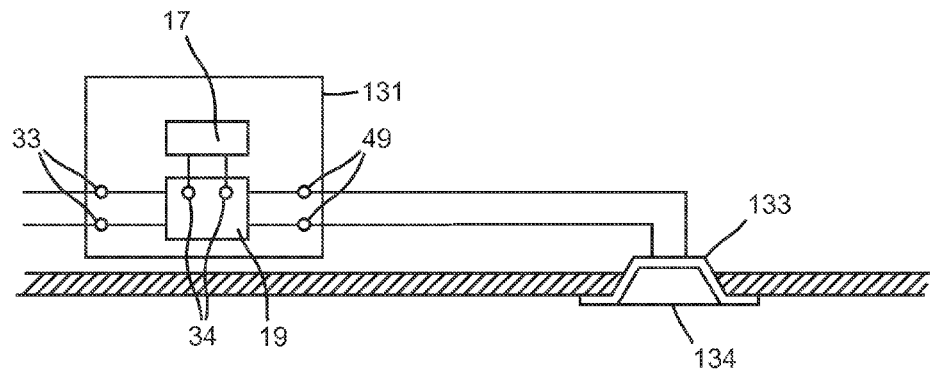
Figure 13:
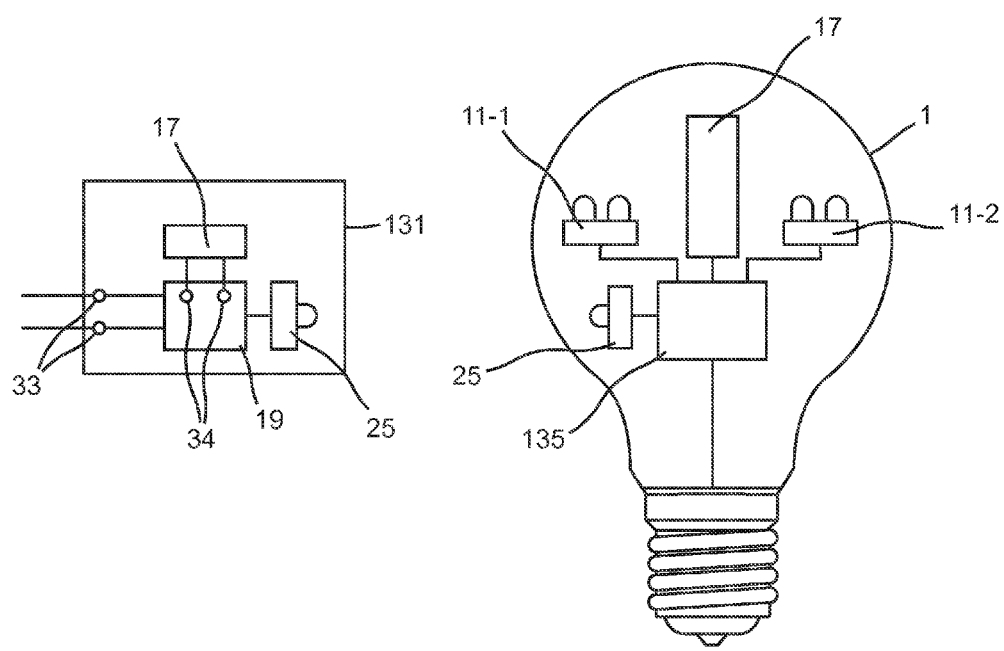

FIGS. 9a, 9b and 9c illustrate alternative arrangements for coupling a sensing circuit and a power supply unit of the circuitry shown in FIG. 3 to a mains input supply;

FIG. 10 is a schematic view of an alternative lighting device embodying the present invention;

FIG. 11a illustrates an in-line adaptor embodying the present invention which can provide emergency lighting upon mains power failure to a conventional light source;

FIG. 11b schematically illustrates an in-line adaptor which is semi-permanently installed and controls power delivery to a pendant light attached thereto;

FIG. 12 schematically illustrates an embodiment in which electronic circuitry like that shown in FIG. 3 is built into a power supply unit used for powering conventional low voltage lights; and FIG. 13 schematically illustrates an embodiment in which electronic circuitry like that shown in FIG. 3 is provided in a remote control device and used to control the operation of one or more lighting devices.

OVERVIEW

Figure 1:
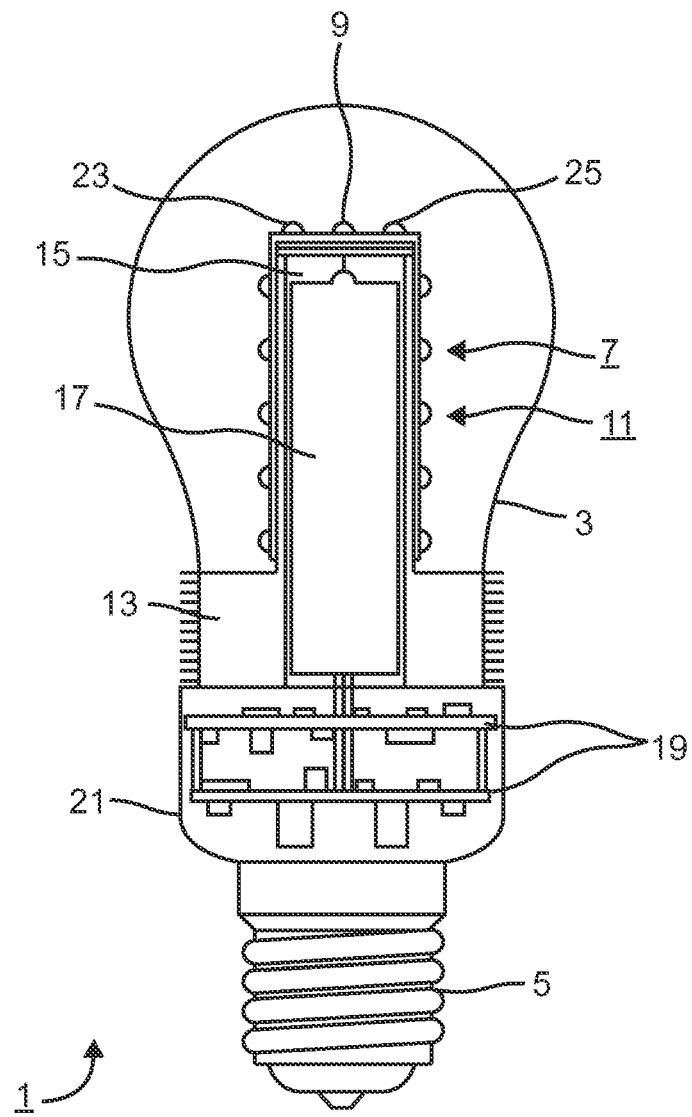
FIG. 1 is a schematic view of one embodiment of a lighting device for connection to a conventional lamp holder and wiring installation and which can provide a backup light function in the event of mains failure.

FIG. 1 shows an example of a lighting device 1 embodying the present invention. In this instance, the lighting device 1 is in the form of a traditional look-a-like light bulb that has an optically transparent/translucent housing 3 that is mechanically coupled to a fitting 5. The fitting 5 is for connecting the lighting device 1 to a conventional lamp holder (in this case illustrated as a conventional screw type holder), which in turn connects the lighting device 1 to a primary power supply.

One or more light sources 7 are provided within the transparent housing 1. In this embodiment, the light sources 7 include a plurality of light emitting diodes 9. In this example, the multiple light emitting diodes 9 are arranged in one or more arrays 11 so that the lighting device 1 has a wide angle of illumination. To achieve optimum efficacy, efficiency and life span, the LED array(s) 11 are mechanically fixed and thermally connected to a heatsink 13. The structure and function of the heatsink 13 is described in the applicant's earlier GB application (GB 1014428.5), the content of which is incorporated herein by reference. As shown in FIG. 1, the heatsink 13 has a cavity 15 in which a battery 17 is mounted. As will be explained in more detail below, the battery 17 is for powering the light source(s) 7 in the event of a mains power failure.

Electronic circuitry 19 is provided within a base 21 of the lighting device 1. The electronic circuitry 19 includes circuitry for sensing when there is a primary power failure and circuitry for coupling the battery 17 to the light sources 7 to provide light during such a primary power failure. In most installations, the lighting circuit (in which the lighting device 1 will be installed) will include one or more manually operable switches for allowing the user to switch on and off the lighting device 1. Therefore, the electronic circuitry 19 is able to sense when such switches are open and when they are closed. The way in which this sensing is performed will be described in more detail later.

Lighting Circuit

Figure 2:
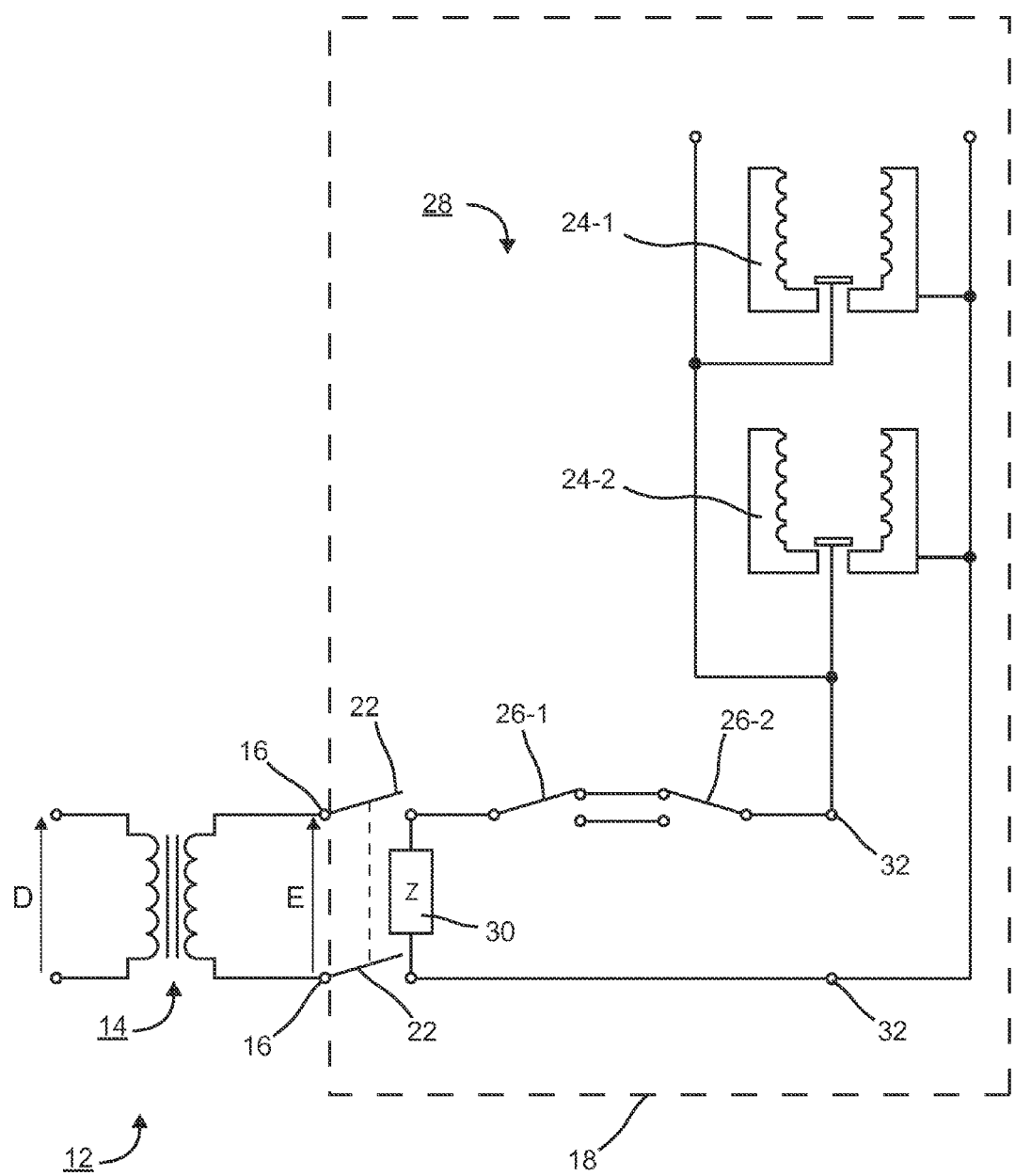
FIG. 2 is a schematic diagram illustrating the connection of the lighting device shown in FIG. 1 in a typical wiring installation.

FIG. 2 is a schematic diagram illustrating a typical electrical installation 12 in which the lighting device 1 shown in FIG. 1 may be installed. As illustrated in FIG. 2, local or national grid supplied AC power is typically transformed down from a very high transmission potential D, usually in the order of thousands of volts, to a lower "mains" supply voltage by a transformer 14. The secondary winding of the transformer 14 will provide power to one or more local consumers across terminals 16, here representing the external connections into a building 18. This input supply (shown as potential E) usually passes through one or more appropriate current limiting protection devices 22 (fuses, circuit breakers etc.) which are typically mounted within a distribution board, consumer unit or the like. As shown in FIG. 2, two lamp holders 24-1 and 24-2 are connected within a lighting circuit 28 to the current limiting devices 22 via user operable switches 26-1 and 26-2. In this illustration, the switches 26 are shown in a two-way configuration, although there may only be a single switch 26 or multiple switches connecting the holders 24 to the current limiting devices 22. Thus, lighting devices 1 mounted in such lamp holders 24 will have a mains power supply as the primary power supply for illuminating the light sources 7.

As shown in FIG. 2, the impedance within the building 18 between the supply terminals is represented by the impedance (Z) 30. This impedance 30 is created by loads such as other electrical appliances and other devices that are connected to the incoming power supply at terminals 16, via the current limiting protection devices 22. It is this impedance 30 (optionally together with the impedance of the current protection devices 22 and the impedance of the transformer 14) that creates a useful detectable difference in impedance of the lighting circuit 28 when the user operable switches 26 are in the open and closed states.

Thus when mains power is removed from a lighting device 1 mounted in one of the lamp holders 24, the lighting device 1 can detect if the switches 26 are open circuit or closed circuit by measuring the impedance across its primary supply terminals 32 and thus determine if the mains power has been removed by a power failure or by a user switching one of the switches 26. Various different approaches can be taken in order to measure this impedance and hence to determine the positions of the manually operable switches 26. As will be explained in more detail below, the approach taken should ensure that measurements taken by one lighting device 1 do not interfere or detrimentally affect the operation of another lighting device mounted in the same lighting circuit 28 and controlled by the same switches 26 or on the same supply circuit as potential E. Additionally, care should be taken to ensure that when multiple lighting devices 1, like the one illustrated in FIG. 1, are connected to the same lighting circuit 28, measurements by one lighting device 1 do not interfere with the measurements of other lighting devices 1. The preferred way in which this is achieved is described in more detail later.

Operating Modes

In this embodiment, the lighting device 1 has a number of different modes of operation and the current mode of operation is typically determined based on external conditions of the power supply to the lighting device 1. From the discussion above, the supply itself may be categorised into three states: power present, power not present when the supply is open circuit (high impedance), and power not present when the supply is closed circuit (low impedance).

Primary Mode of Operation

The primary mode of operation is defined to occur when there is a primary power supply electrically connected to the fitting 5 that can provide electrical energy to illuminate the light source(s) 7 and thereby produce useful light. During this primary mode, the battery 5 may also be intelligently (re) charged as required using energy from the primary power supply, typically via a step-down transformer, switched mode power supply or other voltage reducing and rectifying sub-system. The charging of the battery 17 is controlled by the electronic circuitry 19 which monitors the charge rate and cell voltage to prevent overcharging or over rapid-charging.

During the primary mode of operation, electrical power is being provided by the primary power supply and therefore, there is no power failure. Accordingly, it is not necessary for the electronic circuitry 19 to sense the impedance of the supply lines to determine if any user operable switches are opened or closed. Therefore, the sensing can be inhibited during this primary mode of operation. However, such sensing may be optionally continued, if desired, and any results ignored since the impedance is unlikely to be measurable when the primary power is present.

Secondary Mode of Operation

During the secondary mode of operation, the lighting device 1 is configured to produce useful light using power from a secondary power supply (in this case from the battery 17). The lighting device 1 is set into this mode for the duration that the lighting device 1 is connected to the primary power supply via the fitting 5 and there is an absence of primary power and the processing electronics 19 determines that there is a low impedance (typically below 5 k ohms) between the supply lines. The measurement of the supply impedance may be made continuously, periodically, randomly or pseudo randomly. Such random or pseudo random measurement may also help to avoid interference with other similar lighting devices 1 connected in the same lighting circuit (for example multiple lights controlled by a common light switch, such as a chandelier). The way that the multiple lighting devices 1 can operate together will be described in more detail later.

In this preferred embodiment, the processing electronics 19 are arranged so that if the lighting device 1 is connected electrically via fitting 5 to a low impedance load, the lighting device is arranged to enter this secondary mode of operation and therefore to cause the lighting device 1 to generate light using power from the battery 17. This allows the lighting device 1 to be tested for demonstration, diagnostic or other purposes—for example by shorting the supply terminals on the fitting 5 with a suitable low impedance electrical connection (such as a user's hand). The processing electronics 19 can also set the lighting device 1 into its secondary mode of operation during diagnostic testing or in response to an input command received, for example, from an external device.

Dormant Mode of Operation

In the dormant mode of operation, the lighting device 1 is configured to emit no useful illumination, although the electronic circuitry 19 is partially active. The lighting device 1 is configured to enter the dormant mode of operation for the duration that there is no primary power input via the fitting 5 when the lighting device 1 is connected to a lighting circuit 28 and when there is a high impedance load connected to the supply lines (typically above 10 k ohms). Again, the measurement of this impedance may be made continuously, periodically, randomly or pseudo randomly. The lighting device 1 exits the dormant mode when mains power is restored across the mains supply terminals (in which case it returns to the primary mode discussed above) or if the sensing circuitry senses a low impedance load connected to the main supply lines whilst there is still no mains power (in which case it returns to the secondary mode discussed above).

As will be described in more detail later, in this preferred embodiment, the electronic circuitry 19 employs various energy saving techniques and circuit components that minimise the power drawn by the electronic circuitry 19 from the battery 17 during the dormant mode of operation.

Sleep Mode of Operation

In the sleep mode of operation, the lighting device 1 is configured to emit no useful illumination and the electronic circuitry 19 is arranged to make no impedance measurements. The sleep mode of operation may be entered after the lighting device 1 has been in the dormant mode of operation for a predetermined period of time (for example six months), or should the battery charge fall below a low threshold level, or when it is signalled to do so by an external device or by the user applying certain predefined conditions on the lighting device 1—such as by switching primary power to the lighting device 1 six times in a three second period. Detection of the mains signal may be made, for example, by detecting that the signal received at the primary supply terminals has a frequency within an expected frequency range (for example between 40 Hz and 70 Hz). The lighting device 1 is preferably set into its sleep mode as the default condition when it is manufactured, such that there remains no or minimal drain on the battery 17 until the product is installed by the user. The lighting device 1 may be "woken" from the sleep state by, for example, applying primary power to the lighting device 1.

When the device changes state from primary mode to secondary mode when the primary supply is removed, the lighting device 1 instantly switches to secondary mode (light on) whilst it measures external conditions. This ensures that there is no flicker or interruption to illumination during a power failure. If the measurements indicate that the switches 26 are open circuit, then the lighting device 1 will turn the light sources 7 off and enter the dormant mode. Similarly, when operating in the secondary mode and the lighting device detects a mains signal at the primary supply terminals, the lighting device 1 does not immediately enter primary mode—instead it waits and confirms that the mains supply is stable before returning to the primary mode.

Diagnostic and Mode Indicators

In this embodiment, the lighting device 1 has a diagnostic indicator 23 in the form of a light emitting diode that is connected separately to the electronic circuitry 19. The electronic circuitry 19 can control the diagnostic indictor 23 to either continuously or intermittently indicate the current operating mode and/or to indicate any fault detection therein. This may be achieved, for example, by varying the illumination of the diagnostic indicator 23 or, if multiple different LEDs are provided with different colours, these can be illuminated to indicate different diagnostic states.

Remote Control

As shown in FIG. 1, the preferred lighting device 1 also includes a communication transducer 25 that can receive signals from and transmit signals to another device (not shown) that is remote from the lighting device 1. These external signals may be used, for example, to control the operation of the lighting device 1, if diagnostic testing or configuration by a remote operator is desired. The communication transducer 25 may be, for example, an optical transducer (such as an infra-red transducer) or an acoustic or an electromagnetic transducer (such as an RF transceiver) which can communicate with the remote device using corresponding wireless signals. The remote device can be a simple battery or otherwise powered hand held controller having a number of functional buttons (or the like) for allowing a user to input control commands to the lighting device 1.

This remote control feature may be used, for example, to vary the brightness of the light generated by the lighting device 1. This can be achieved, for example, by varying the power (current and/or voltage) applied to the light source(s) 7. Alternatively, if the light source(s) 7 are arranged in different groups, with the light source(s) 7 in each group being independently powered by the electronic circuitry 19, then the brightness can be varied by varying the number of light source(s) 7 that are simultaneously powered.

The communication transducer 25 can also be used to communicate the status and/or diagnostic information to the remote device. For example, the electronic circuitry 19 may be arranged to monitor the charge status of the battery 17 and this remaining charge status may be signalled to the remote device via the communication transducer 25.

The communication transducer 25 can also be used to receive user programming information input via an external device for storage within a memory of the electronic circuitry 19. This user programming could define, for example, emitter brightness in primary and/or in secondary modes of operation or the frequency or manner in which self-diagnostic tests and results are performed and signalled via the diagnostic indicator 23. The remote control signal can also be used to turn on the lighting device 1 even when there is no power failure or when the user operable switches 26 are open circuit. This function could be used, for example, in a building scenario where a central control station instructs a plurality of lighting devices 1 within the building to switch on at a defined level of illumination for night time illumination purposes.

Electronic Circuitry

FIG. 3 is a block diagram illustrating the main components of the electronic circuitry 19 used in this preferred embodiment. As shown, the circuitry 19 includes a power supply unit 31 that is connected to primary supply terminals 33 provided in the fitting 5, for connection to the mains supply; and secondary supply terminals 34 for connection to the positive and negative terminals of the battery 17. The power supply unit 31 is configured to transform the primary supply voltage, for example by step-down transformer, switch mode power supply or other voltage reducing and rectifying subsystem; and to provide power derived from the primary supply (or if it senses that there is no primary supply at the supply terminals 33, to supply power from the battery 17 via terminals 34) to a processor 35 that controls the operation of the lighting device 1. The power supply unit 31 also provides the power required for illuminating the light source 7.

The electronic circuitry 19 also includes sensing circuitry 37 which is configured to sense the impedance across the primary supply terminals 33; a charging circuit 39 for charging the battery 17 via the terminals 34; a diagnostic module 41 for performing the various diagnostic testing discussed above and for controlling the diagnostic indicator 23 via terminal 43; and a communications module 45 for communicating with remote devices via the communication transducer 25 connected via terminal 47.

As shown in FIG. 6, in this embodiment, the electronic circuitry 19 also includes two output drivers 50-1 and 50-2 that are controlled by the processor 35 and that provide the desired drive currents for driving the light sources 7 via output terminals 49 and 51. In this embodiment, the light sources 7 are arranged in two groups, with the light sources 7 in each group being driven by a respective one of the output drivers 50. Thus, in this embodiment, the processor 35 can switch on the light sources 7 in both groups at the same time or the light sources 7 in either one of the groups by controlling the respective output driver circuits 50. The processor 35 can also vary the brightness of the light sources 7 in each group by setting a desired drive power for each output driver circuit 50.

In the block diagram illustrated in FIG. 3, the different modules are shown as being separate modules from the processor 35. In practice, the functionality of many of the modules shown in FIG. 3 will be software modules run by the processor 35 or a mix of software and hardware. The modules have been illustrated in the form shown in FIG. 3 for ease of understanding the functions and operation of the different modules. A more detailed description of the various modules will now be given.

Processor

In this embodiment, the processor 35 is at the heart of the electronic circuitry 19 and controls the operation of all of the modules shown in FIG. 3. The processor 35 may be based on an ASIC device but is preferably a programmable processor (such as a PIC microcontroller) having memory and software that defines its operation. Such software controlled processors are easier to update with improved software or additional functionality after installation. During the primary mode of operation, the processor 35 is powered from a voltage derived from the primary supply; and in the secondary and dormant modes of operation it is powered by a voltage derived from the battery 17.

Charging Circuit

The charging circuit 39 is provided to monitor the charge status of the battery 17 (via the power supply unit 31) and to charge (or recharge) the battery 17 when needed. By monitoring the charge status of the battery 17, the charging circuit 39 can ensure that the battery 17 is not overcharged. The charging circuit 29 can also signal the present battery charge status to the diagnostic module 41 for historical recording and analysis (such as to adjust brightness levels for a given minimum duration e.g. 3 hours) and/or for output to the user either via the diagnostic indicator 23 or via the communication transducer 25. In this embodiment, the charging circuit 39 also manages battery usage in the secondary mode of operation, so that the battery charge is not completely exhausted—resulting in battery damage. Therefore, in this embodiment, the charging circuit signals the processor 35 to stop emergency illumination when the battery charge falls below a defined lower threshold level.

Diagnostic Module

The diagnostic module 41 performs various diagnostic tests and presents the diagnostic results to the user via the diagnostic indicator 23. The diagnostic results can also be stored within a memory (not shown) of the processor 35 to maintain an historical record of the operation of the lighting device 1. The diagnostic module 41 may interact with the charging circuit 39 in order to obtain battery charge status information and with the sensing circuitry 37, the communication module 45 and the output drivers 50 to confirm correct operation thereof. The operation of the diagnostic module 41 can be controlled by the user either via signals received using the communication transducer 25 or other signals communicated, for example, over the primary supply via terminals 33.

Communications Module

The communications module 45 is operable to control communication between the lighting device 1 and an external device via the communication transducer 25. The communications module 45 is responsible for performing any required modulation and demodulation of the data to be transmitted to and received from the remote device. For example, the communications module 45 may transmit diagnostic data obtained from the diagnostic module 41 to a remote device for remote monitoring of the operation of the lighting device 1. Alternatively, user configuration data may be received from the remote device and programmed into the processor 35.

Output Driver

The output drivers 50 are controlled by the processor 35 and generate the driving currents (or voltages) required to drive the light sources 7. The output driver 50 used will depend on the technology and configuration of the light source(s) 7 being driven. In this embodiment, the light sources 7 are LEDs and the output drivers 50 can be commercially available integrated circuit LED drivers having features such as efficient Pulse Width Modulation (PWM) current feedback driving of the LEDs, whether individually or in one or more "strings". Each output driver 50 is controlled (independently or as a single entity) by the processor 35 and can generate a respective different drive current (or voltage) at its output terminals 49/51. The output drivers 50 obtain their power for generating the drive signals from supply voltages generated by the power supply unit 31.

Sensing Circuitry and Power Supply Unit

As shown in FIG. 3, the sensing circuitry 37 is configured to sense the impedance across the primary supply terminals 33 via the power supply unit 31. The way in which this connection is made and the way in which the sensing circuitry 37 performs the measurement, in this preferred embodiment, will now be explained with reference to FIG. 4. As shown in FIG. 4, the sensing circuit 37 is connected to the primary supply terminals 33 via isolating resistors 61 and 63, which prevent the primary supply from damaging the sensing circuitry 37. When the sensing circuitry 37 wishes to make a measurement of the impedance across the supply terminals 33, the sensing circuitry 37 applies a measurement voltage across the supply terminals 33, which may be referenced to or isolated from the ground potential. The magnitude of this measurement voltage is preferably between 1 and 9 volts and typically at a voltage level similar to that provided by the battery 17 (such as 3 volts). This is much smaller than the magnitude of the mains supply voltage which is an AC voltage having an RMS value typically between 88 volts and 265 volts. As will become apparent from the following description, therefore, when the mains supply voltage is present at the terminals 33, the sensing circuitry 37 is not able to use the measurement voltage to sense the impedance across the supply terminals 33. However, this is not important as there is no need for the electronic circuitry 19 to measure the impedance across the supply terminals 33 when the primary supply voltage is present. Indeed, in the preferred embodiment, the processor 35 inhibits the sensing circuitry 37 from generating the measurement voltage during the primary mode of operation, when the supply voltage is present across the terminals 33. The presence of the supply voltage may be detected, for example, by checking that the mains voltage level across the primary supply terminals 33 is within predefined limits of expected values of the voltage or by checking that the frequency of the supply voltage is within expected values of frequency, for example, by checking that the primary supply voltage has a frequency above 40 Hz and below 70 Hz.

As shown in FIG. 4, the primary supply terminals 33 are connected to a bridge circuit 69 which converts the AC supply voltage into a DC voltage which is input to a switch mode power control module 71 via a zener diode 73. The switch mode power control module 71 then converts the input DC voltage into the appropriate output voltages required for powering the other components of the electronic circuitry 19 and for powering the light source(s) 7.

The reason for using the zener diode 73 will now be explained. As discussed above, the purpose of the sensing circuitry 37 is to sense the impedance across the supply terminals 33. However, the supply terminals 33 are connected both to the lighting circuitry 28 (shown in FIG. 2) and to the circuit components of the power supply unit 31 and the rest of the electronic circuitry 19. Therefore, if the power supply unit 31 and/or the other circuitry in the lighting device 1 provide a low impedance path between the supply terminals 33, then the sensing circuitry 37 may mistakenly interpret that user operable switches 26 in the lighting circuit 28 are closed (low impedance) when in fact they are open (high impedance). Therefore, in this embodiment, the zener diode 73 is used in order to provide isolation between the sensing circuitry 37 and the rest of the electronic circuitry 19. This isolation is achieved because the magnitude of the measurement voltage is less than the zener diode breakdown voltage and therefore the zener diode 73 provides a high impedance to the sensing circuitry 37 (or at least to the measurement voltage). Of course, when the primary voltage is applied across the supply terminals 33, the rectified DC voltage applied across the zener diode 73 is much larger and will be greater than the breakdown voltage of the zener diode 73. Therefore, when the primary supply voltage is present at the terminals 33, the rectified voltage from the bridge circuit 69 passes through the zener diode 73 to the switch mode power control module 71. Similar isolation can be achieved using other semiconductor junction devices—for example using a number of diodes connected in series such that the voltage drop across all of the diodes is greater than the measurement voltage, or if the measurement voltage is lowered below the breakdown voltage of a conventional diode, then the zener diode 73 may be replaced with a conventional diode.

As shown in FIG. 4, a capacitor 75 is connected across the primary supply terminals 33. This capacitor 75 is conventionally used to improve the performance of lighting devices in terms of EMC compliance and performance and the like. In this preferred embodiment, however, the capacitor 75 is also used by the sensing circuitry 37 when determining the impedance between the supply terminals 33. In particular, the capacitor 75 offers a known circuit component for the sensing circuitry 37 to detect as a reference and allows for self-test verification of its sensing functionality.

Measurement Process

As mentioned above, when the sensing circuitry 37 performs a measurement, it applies a measurement voltage across the supply terminals 33. In this embodiment, to minimise the risk of interference between similar lighting devices 1 on the same lighting circuit and to minimise the energy drawn from the battery 17 when making the measurements, the sensing circuitry 37 generates a measurement signal 65 that comprises a sequence of voltage pulses 67 (which are illustrated here as being square wave pulses, but they could have different pulse shapes). During each voltage pulse 67, charge will be stored on the capacitor 75 which will then decay over time once the voltage pulse 67 has ended. The rate at which the charge on the capacitor 75 accumulates and then decays depends on the impedance across the supply terminals 33 and hence on the state of the user operable switches 26.

FIG. 5 shows a number of graphical representations of the transmitted pulses 67 (FIG. 5*a*) and the corresponding charge (voltage) across the capacitor 75 that results (FIGS. 5*b* and 5*c*). FIG. 5*a* illustrates the voltage pulses generated by the sensing circuitry 37. The duration (T0) of each voltage pulse 67 is typically in the order of milliseconds and the period (T)

between pulses is typically in the order of 0.1 to 10 seconds. FIG. 5b illustrates the way in which the voltage across the capacitor 75 accumulates and then decays over time when the manually operable switches 26 are in their open (high impedance) state; and FIG. 5c illustrates the way in which the voltage across the capacitor 75 accumulates and then decays over time when the manually operable switches 26 are in their closed (low impedance) state. As can be seen by comparing the plots shown in FIGS. 5b and 5c, the rate at which the voltage across the capacitor 75 accumulates and then decays depends on the impedance across the supply terminals 33 and hence in dependence upon the state of the manually operable switches 26. Therefore, the sensing circuitry 37 can sense the present state of the manually operable switches 26 by monitoring the voltage across the capacitor 75. There are various ways in which the sensing circuitry 37 can perform this monitoring and some of these will now be discussed.

One technique for sensing the state of the switches 26 is illustrated in the left hand waveforms of FIGS. 5b and 5c respectively. In this technique, the sensing circuitry 37 measures the time taken for the decaying voltage to fall from point W1 (corresponding to a known voltage V1 across the capacitor 75) to a point W2 (corresponding to a known voltage V2 across the capacitor 75); and then compares the determined time (T1 in the case of the plot shown in FIG. 5b and T2 in the case of the plot shown in FIG. 5c) against a predetermined threshold. If the determined time is above the threshold, such as is the case for the plot shown in FIG. 5b, then the manually operable switches 26 are determined to be in the open state; whereas if the determined time is below the threshold, such as is the case for the plot shown in FIG. 5c, then it is determined that the manually operable switches 26 are in the closed state.

The predetermined threshold value that is used in the determination may be a factory set constant or it may be adapted depending on the installation in which the lighting device 1 is installed. For example, the sensing circuitry 37 may be arranged to sense the variation in impedances over a predefined period and detect the minimum value of measured time and the maximum value of measured time. The threshold value can then be set somewhere in the middle between these two times. Alternatively, during an installation procedure, the user may be requested to switch the manually operable switches 26 on and off a number of times (when the primary supply is isolated from the lighting circuit) so that measurements can be obtained when the switches 26 are open and when they are closed. An appropriate threshold value can then be determined for the given installation. Since the impedance 30 within the building or on the lighting circuit 28 may change over time, the sensing circuitry 37 can keep a running average value for the high impedance measurements and a running average value for the low impedance measurements that it makes and then use these average values to re-set the threshold value from time to time.

The threshold potentials V1 and V2 used in this technique may also be factory set threshold values or they too may be dynamically set during a calibration routine for the lighting device 1 once it is installed in the lighting circuit 28. The values are preferably chosen so as to yield a reliably wide spread in measured times between the open and closed states of the manually operable switches 26.

An alternative measurement technique is illustrated in the right hand plots shown in FIGS. 5b and 5c. In particular, in this technique the sensing circuitry 37 is arranged to measure the time taken for the voltage across the capacitor 75 to fall from its measured maximum value (V3) at point W3 to a point W4 at which the potential as fallen to a value V4 which is a set fraction (for example one fifth) of the peak potential V3.

Thus, as before, when there is a high impedance connected across the supply terminals 33 (when the switches 26 are open), the measured time, T3, will be greater than the threshold, and conversely, the measured time, T4, will be below the threshold when there is a low impedance across the supply terminals 33 (when the switches 26 are closed).

With either of the techniques described above, the sensing circuitry 37 preferably uses a window comparator, such as the window comparator 81 shown in FIG. 5d (which may be implemented in hardware and/or software). In this case, the input voltage V in (which is the voltage across the capacitor 75) is input to two comparators 83-1 and 83-2. In comparator 83-1, the input voltage is compared with the high voltage reference value (corresponding to the voltage V1 for the first technique or the measured maximum capacitor voltage V3 in the second technique) and in the other comparator 83-2, the input voltage is compared against the low voltage reference value (corresponding to voltage V2 in the first technique or voltage V4 in the second technique). The output signal V out from this window comparator 81 will be at a low level when the input voltage is between the two reference levels and will be at a high value otherwise. The sensing circuitry 37 can then measure the times T1 and T3 as being the time between the falling edge and the rising edge of the output voltage V out.

A further alternative method for sensing the impedance across the supply terminals 33 is only to use a single measured value on the falling edge of the capacitor voltage. In particular, given that the sensing circuitry 37 knows both the duration T0 and the amplitude V0 of each measurement voltage pulse 67, then a fractional proportion of this amplitude value may be taken as the timing end point. Thus, the sensing circuitry 37 may calculate the time taken for the voltage across the capacitor 75 to fall to the given threshold value from the rising or falling edge of the voltage pulse 67. Alternatively still, the sensing circuitry 37 may simply measure the instantaneous voltage across the capacitor 75 at a predetermined time after the rising or falling edge of the measurement voltage pulse 67. When the impedance across the supply terminals 33 is large, the measured voltage will be larger than when the impedance across the supply terminals 33 is small. However, such absolute measurements are not preferred as they are more susceptible to noise and measurement error. Indeed, in the preferred embodiment, once the sensing circuitry 37 has made an initial determination of the state of the manually operable switches 26, the sensing circuitry 37 then compares the measurements obtained from successive measurement voltage pulses 67 in order to detect a change of state of the manually operable switches 26. It does this by detecting a significant change in the measured times from one measurement to the next. Once the sensing circuitry 37 detects a change of state of the manually operable switches 26, it performs a number of additional measurements to confirm the change of state before changing the operating mode of the lighting device 1. These additional measurements are used in case the first measurement that indicated the change of state is caused by noise or measurement error, or in case it conflicts with measurement signal(s) from one or more other similar lighting devices 1.

Interference between Multiple Lighting Devices

As mentioned above, multiple lighting devices 1 (like the one shown in FIG. 1) may be connected in parallel on a given lighting circuit 28, such as in a multiple fitting luminaire, chandelier or the like. Each lighting device 1 will generate its own set of measurement pulses 67 for impedance sensing when they are in the dormant and secondary modes of operation. When a measurement voltage pulse 67 is applied across the supply terminals 33 by one lighting device 1, the connection of the other lighting devices 1 will provide an apparent additional capacitive load measured across the supply terminals 33 (because of capacitor 75). This will change the charge rate and the decay rate of the capacitor voltage measured by the sensing circuitry 37. Therefore, again, during an appropriate calibration routine, the sensing circuitry 37 can refine, as appropriate, a threshold used to maximise the sensing accuracy of the sensing circuitry 37. From the charge up rate, the sensing circuitry 37 can also estimate the number of other similar lighting devices connected on the same lighting circuit 28 (since it knows the capacitance value of the capacitor 75 and it can assume that similar capacitors will be provided in the other lighting devices).

As mentioned above, the duration (T0) of each measurement voltage pulse 67 and the time period (T) between pulses are preferably selected so as to minimise the chances of two lighting devices 1 (which are connected in the same lighting circuit 28) from applying measurement voltage pulses 67 to the primary supply terminals 33 at the same time. In particular, if the period T is much greater than the duration T0 of each voltage pulse 67 (in this example embodiment, it is between 100 and 1000 times greater) then it will be quite rare for two or more lighting devices 1 to apply their measurement pulses across the supply terminals 33 at the same instantaneous point in time. The chances of such collisions can be reduced further by randomly or pseudo randomly varying the time period T between success measurement pulses 67. This may be achieved, for example, by using a constant period T and by adding or subtracting a randomly or pseudo randomly varying amount at each measurement point. The combination of this random amount and variations in the clock frequencies between the lighting devices 1 (an inherent difference between physical manufactured components) will likely reduce further the possibility of two or more lighting devices 1 applying their measurement pulses 67 across the supply terminals 33 at the same time.

In the rare event that other lighting devices 1 do apply their measurement pulses 67 across the supply terminals 33 at the same or at similar times, an incorrect reading will be obtained. However, as mentioned above, in the preferred embodiment the sensing circuitry 37 uses the measurements obtained from a number of measurement pulses 67 before taking a decision. This means that the measurement obtained from a single pulse will not be used in isolation and therefore, errors caused by such simultaneous (or overlapping) measurements by other lighting devices 1 should not cause the lighting devices 1 to operate incorrectly, hence provide reliable operation.

In addition to varying the pulse period, T, to avoid collisions with other lighting devices 1, the pulse period T may also be varied for other purposes. For example, when the sensing circuitry 37 initially detects a change in the impedance across the supply terminals 33, the sensing circuitry 37 may shorten the period between successive pulses in order to confirm that the changed circuit impedance is both valid and sustained before the decision is taken to change the operating mode of the lighting device 1.

Conversely, the period between measurement voltage pulses 67 may be intelligently extended over time in order to conserve battery power. In particular, when the lighting device 1 is last switched from its primary operating mode (or its second operating mode) to its dormant operating mode, then the sensing circuitry 37 may be arranged to measure the impedance across the supply terminals 33 at a normal repetition period T. However, if the operating state of the lighting device 1 does not change during an extended period of time (for example for a number of weeks or months) then the sensing circuitry 37 may be arranged to extend the interval between measurement voltage pulses 67. Typically, the normal period (T) between measurement pulses voltage 67 is between 50 and 500 milliseconds; this period may be extended to, for example, the order of seconds. Delaying the measurement pulses in this way will significantly reduce the power drawn from the battery 17 during the dormant mode of operation, at the expense of a slight delay in switching on the emergency lighting when needed. The period between measurement voltage pulses 67 may also be made dependent on the charge state of the battery 17. In particular, as the charge on the battery reduces, the processor 35 may signal to the sensing circuitry 37 in order to increase the interval (T) between measurement voltage pulses 67. In this way, the drain on the battery 17 can be minimised.

Master/Slave Operation

When there are multiple lighting devices 1 (such as those shown in FIG. 1) on the same lighting circuit 28 or in the same locality, interference between the lighting devices 1 may be reduced further by making one of the lighting devices 1 a master lighting device, which performs impedance measurements and by making the other lighting devices 1 slave devices, which do not perform impedance measurements. Such a master/slave pair of lighting devices is illustrated in FIG. 6. The master lighting device is designated 1-M and the slave is designated 1-S. In this case, when the master lighting device 1-M determines that there is a power failure and that the manually operable switches 26 are in the closed state, it signals to the other slave lighting devices 1-S that they should enter their secondary modes of operation so that they will generate light using power from their internal batteries 17. Communication between the lighting devices 1 may be achieved using their communication transducers 25. Alternatively, the master lighting device 1-M may signal the other lighting devices 1 that are connected to the same lighting circuit 28 by applying a communication signal across the supply terminals 33. This communication signal may be modulated on to a suitable carrier frequency that will allow the slave lighting devices 1-S to differentiate the communication signal from any primary supply signal received at the supply terminals 33.

When the communication transducers 25 are used to communicate between the lighting devices 1 and one or more of the slave lighting devices 1-S are out of range of the master lighting device, one or more of the other slave devices 1-S that are within communication range of the master lighting device 1-M may operate as repeaters or relay devices in order that messages to or from the master lighting device 1-M can be communicated with such "out of range" slaves.

In order to limit interference caused by the electronic circuitry 19 of the slave lighting devices 1-S, each lighting device 1 may also include a relay or similar isolation or interruption device 77 that can disconnect its excitation circuitry 19 from the supply terminals 33. In this way, if a lighting device 1 has been configured as a slave device, then it will activate the isolation device 77 in order to isolate its electronic circuitry 19 from the supply terminals 33 in all operating modes except the primary operating mode. In this way, when the slave(s) and the master lighting devices 1 are in the dormant or secondary modes of operation, the master 1-M will perform the impedance measurements and all of the slave lighting devices 1-S will effectively be open circuit between the supply terminals 33 due to the isolation device 77. If the master lighting device (or some other device) determines that the operating mode should be changed, then the master lighting device 1-M signals the change of state to the slave lighting devices 1-S which adapt their operating modes accordingly. If the slave lighting devices are returned to their primary mode of operation, then they will deactivate the isolation device 77 so that the electronic circuitry 19 of the slave device 1-S is again connected to the supply terminals 33.

Therefore, as those skilled in the art will appreciate, the provision of such an isolation device 77 in each of the slave devices 1-S can improve the effectiveness or efficiency of the impedance sensing due to removing possible interference created by the slave devices. Additionally, utilising only one lighting device as the master means that battery drain is minimised (at least on the slave lighting devices). The provision of such an isolation device 77 in a conventional light bulb would also be advantageous—as it would prevent any low impedance path through the conventional bulb form interfering with the measurements made by the master to determine if the light switches 26 are open or closed circuit. Such a light bulb would not have a battery or the sensing circuitry, although it would still need some form of intelligent PSU device to ensure the correct switching in and out of the isolation device 77, when the master is performing its measurements. In such an embodiment, in the event of primary light failure, only the light devices that have a battery or other secondary power supply would provide emergency illumination and the other lighting devices that do not have the secondary power supply would not.

With regard to determining which lighting device 1 is the master and which lighting devices are the slaves, this selection can be made by the user, for example setting configuration data in each lighting device 1, for example by sending configuration signals to each lighting device 1 using the communication transducer 25. Alternatively, the selection may be made automatically depending on the order of connection to the lighting circuit 28. In one embodiment, the role of master lighting device 1-M is rotated between multiple lighting devices in order to equalise battery consumption across the different lighting devices 1. For example, the master lighting device 1-M may be programmed to poll each of the slave lighting devices 1-S in order to determine their current battery charge. Depending on the result of this poll, the current master lighting device 1-M (or an external device) may determine that one of the slave lighting devices 1-S should become the master and an appropriate handover be performed.

Power Control Circuitry

As discussed above, the electronic circuitry 37 is powered either from a voltage generated from the primary supply across terminals 33 or from the battery 17. Switching circuitry is therefore needed to select either the DC voltage derived from the primary supply or battery voltage from the battery to power the light array(s) 11 and/or the circuit components of the electronic circuitry 19.

The circuit arrangement shown in FIG. 7 can automatically allow the highest potential difference from either the primary source potential V (obtained by rectifying the primary supply voltage and output from the switch mode power control module 71 or from some other PSU); or the secondary source potential W (obtained from the battery 17), to provide continual electrical power to the processor 35 and the other electronic components of the lighting device 1. As shown, the circuitry includes two diodes 90-1 and 90-2, with the input of diode 90-1 being connected to the primary power supply potential V and the input of diode 90-2 being connected to the secondary power supply potential W obtained from the battery 17. As shown, the supply potential for the processor 35 is connected to the outputs of both diodes 90. Therefore, the processor 35 will draw its power either from the supply potential V or from the secondary battery potential W depending on their instantaneous values. Therefore, the circuit arrangement effectively provides a simple uninterruptible power supply (UPS) arrangement.

Other system elements (including the light source or array(s)) in addition to or instead of the processor 35 may be powered using the circuit arrangement shown in FIG. 7 (or variations of it). However in certain circumstances, particularly when the circuit arrangement is to power the light array(s), the voltage drop across the diode 90 is likely to cause inefficiency, especially when operating from the battery 17 since this voltage drop may represent a significant portion of the voltage available from the battery 17.

Thus any switching arrangement for switching between primary power and secondary (battery) power is required to have minimal voltage drop or operation inefficiency; whilst preventing the battery power supply from discharging to the primary power supply circuitry. In other words, sufficient full-isolation should be present to prevent connection of the battery directly to the mains-derived DC supply, otherwise there will be no control over the charging of the battery using power from the primary supply.

To avoid the voltage drop associated with the simple diode arrangement of FIG. 7, in the preferred embodiment, the circuitry 92 shown in FIG. 8 is used to control the drawing of battery power from the battery 17. Similar circuitry 92 may also be provided to control the drawing of power from the primary supply voltage(s) output from the switch mode power control module 71. As shown, the load control circuitry 92 has two inverse series connected metal oxide field effect transistors (MOSFETs) 93-1 and 93-2 arranged in a novel way to provide load control whilst preventing reverse current when in an inactive state. The inverse connection of the two MOSFETs overcomes the internal body diode properties inherent with any MOSFET device 93 which would otherwise lead to an undesirable voltage drop and/or current flow through the MOSFETs 93 when they are turned off.

As shown, the circuitry 92 includes an input terminal 94, a control terminal 96 and an output terminal 98. Input terminal 94 is the power input terminal which is connected to the battery 17 via terminals 34 (and illustrated here as being at potential X). The control terminal 96 is an active-low input for controlling the output from the load control circuitry 92, such that applying a negative potential with respect to the input terminal 94 (shown as potential Y) results in a positive output potential at the output terminal 98 (shown as potential Z) that is, in practice, marginally below the potential (X) at the input terminal.

Impedance device 100 (typically a resistor) provides a source of power to the control terminal 96 from the input terminal 94. This is relevant in the event of other system elements, such as the processor 35, entering a long-term hibernation or 'sleep mode' for prolonged or sustained periods, for example due to low battery charge levels, until the primary power supply next becomes available. This impedance device 100 therefore keeps the control input terminal 96 close to the input potential (X) when the feeding control circuit (e.g. the processor 35) for control terminal 96 is in a high impedance or disconnected state. This ensures that the MOSFETs 93 remain off and thus maintain a high impedance between the input terminal 94 and the output terminal 98.

As shown in FIG. 8, the two MOSFETs 93 each have a gate (labelled G), a source (labelled S) and a drain (labelled D). MOSFETs have a problem in that there is always an inverse "body diode" inherent in the structure of the device. In order to remove this problem, two MOSFETs are connected in series such that the drain of MOSFET 93-1 is connected to the drain of MOSFET 93-2. This means that the inherent body diodes (illustrated and labelled 101-1 and 101-2 in FIG. 8) of the MOSFET switches 93 oppose each other. This eliminates the resulting issue of reverse current flow through the body diode when the MOSFET is not switched on. When the MOSFETs 93 are switched on, the voltage drop across the pair of MOSFETs is minimal and presents no problem to the operation of the circuit. This is a significant saving when compared to the normal battery voltage or the mains supply derived voltage(s) generated by the switch mode power control module 71 (which is typically a few volts). A similar advantage can be achieved if the MOSFETs 93 are connected so that the source of one MOSFET is connected to the source of the other MOSFET.

Therefore, by employing two opposing MOSFETs 93 in this manner, there is no problem of voltage drop across the MOSFETs 93 when they are switched on, and when the MOSFETs 93 are in a high impedance state, the two reverse-connected body diodes 101 prevent current flow between the input terminal 94 and the output terminal 98 caused by a potential difference between the primary power supply (obtained via the switch mode power control module 71 or otherwise) and the secondary power supply obtained from the battery 17.

Self Test Diagnostics

Diagnostic module 41 can be configured to perform self-tests for verification and diagnostic purposes. These may be performed continuously or intermittently based upon a time interval, or otherwise by command or event such as upon user demand through signals received via communications module 45 or the like. Alternatively, through monitoring circuit conditions which may include historical stored data and or real time measured values, such as relating to the charging and or discharging performance of the battery 17 or other secondary storage device, the tests may be intelligently scheduled at an appropriate times which, for optimum operational efficiency, may depend upon the current mode of operation of the system.

Tests may include software analysis of data collected over any period of time by processor 35 or other components of the circuitry 19. For example, in the case of verifying function and sufficient performance of battery 17 or the like, analysis may be executed using data collected from measurements of battery voltage and rate of change over time, either during times of charging by the charging circuit 39 (at which time the charge current may instead or in addition be measured by charging circuit 39 or otherwise, for subsequent use as a input data for this analysis), and or during periods when the battery 17 is not being charged.

The analysis may include applying an optional load to the battery 17 to affect a discharge of stored potential therein, thus providing the opportunity to acquire more relevant data measurements such as rate of decay of potential difference etc. This load could be a known load exclusively for this purpose, such as a designated switchable resistor, but may be the light source(s) 7 itself, a load which may be internally measured or approximated from known hardware parameters. In this case, the system may be operating in any mode, but preferably during either primary or secondary modes of operation during which light emission is already required and therefore such a test would go unnoticed. If the test is performed during the primary mode of operation, the battery 17 would provide some or all electrical power to operate the light source(s) 7 for a limited period of time over which data is collected for battery analysis. Such testing may be performed intermittently according to either automatic time scheduling (such as relating to data collected for age or amount of use), or manually (such as according to previous or historical test results, or even upon user demand). This testing may instead or additionally be performed in the case where, depending upon the battery technology being used, it is advantageous for the secondary power supply to be periodically partially or fully discharged, for purposes of extending battery life expectancy or maintaining performance through use cycling. Such a strategic full or partial discharge represents an ideal opportunity for combining both battery conditioning and/or maintenance with performance analysis as part of a diagnostic testing routine.

A full or substantial discharge is not desirable in terms of ability to operate in secondary mode during a power failure, hence such an operation is preferably limited to infrequent occurrence and upon user demand, such as in the case where emergency lighting regulations may require a test of duration performance. Alternatively a partial discharge test may provide sufficient data for an estimation of the battery capacity (either full potential or remaining) to be ascertained and displayed or communicated via diagnostic module 41 or communications module 45.

Advantageously, if the testing is performed during secondary mode when there is already a load present on the battery 17 (of the light source(s) 7), analysis of battery discharge can be performed to ascertain battery performance. Further advantageously, such a testing routine may additionally be used to predict or estimate the likely capacity remaining. Such information may, through control by processor 35 or otherwise, intelligently adjust the power taken from the battery to achieve or optimise current draw to ensure that the emergency lighting will give a minimum duration of lighting, which may be adjusted periodically or constantly with such an aim in mind. Alternatively, such a capacity remaining or duration estimate may simply be stored or used and in some way communicated to the user, such as via diagnostic module 41 or communications module 45.

Modifications and Alternative Embodiments

In the above embodiment, a zener diode 73 was used to isolate the sensing circuitry 37 from the other components of the electronic circuitry 19 when the sensing circuitry 37 is making its impedance measurements. Various other techniques can be used to achieve a similar isolation. For example a relay or transformer could be used to perform the desired isolation. FIG. 9 illustrates three alternative arrangements using power supply transformers to isolate the sensing circuitry 37 from the other components of the electronic circuitry 19 when making impedance measurements. With these transformer designs, the transformer is used to step down the primary supply voltage to a lower voltage which can then be smoothed and converted into a DC voltage using a similar bridge circuit 69 to the one shown in FIG. 4. Whilst such transformer based isolation solutions are less sophisticated than the main embodiment described above, they do offer the advantage that they provide isolation between the sensing circuitry 37 and the primary power supply and isolation between the sensing circuitry 37 and the other components of the electronic circuitry 19.

In the arrangement shown in FIG. 9a, a transformer 82 having primary power supply (J) connected to its primary winding 84 and having secondary winding 86 divided into two parts—having a main secondary winding 86-1 that provides a step down potential K and a tertiary winding 86-2 that connects to the sensing circuitry 37. Operationally, during the primary mode when a supply potential J is present, the potential K (or the combined potential K+L) is used to provide the usual power for the electronic circuitry 19 and for powering the light sources 7. During the dormant and secondary modes, however, the primary potential J is no longer applied and the sensing circuitry 37 applies the measurement pulses across terminals L of the secondary winding 86-2. These pulses will, through normal magnetic flux operation of the transformer 82, induce signals into the primary winding 84. The connection of any circuitry across K will remain constant and therefore can be disregarded. Thus, changes in high or low impedance across J can be measured across L whilst remaining electrically isolated. Therefore, the sensing circuitry 37 can detect changes in the impedance of the lighting circuit 28 in which the lighting device 1 is connected, such as may result from the user switching on or off the user operable switches 26.

FIG. 9b illustrates an alternative transformer arrangement, where two transformers 82-1 and 82-2 are connected in series across the primary power supply having potential M. The operation of this embodiment remains the same as that described above for FIG. 9a, with power taken across N in the primary mode and pulses being transmitted through P when the impedance sensing is being performed by the sensing circuitry 37 during the dormant and secondary modes. FIG. 9c alternatively shows a conventionally deployed transformer 82 providing potential difference R from the primary power supply input Q during the primary mode of operation; and a coil of wire 88 being placed around or in proximity to a connection of the primary winding 84 such that pulses applied across S result in currents being induced in the primary power supply lines. The induced current will depend on the impedance of the primary supply lines which will in turn induce a back EMF across S which can be sensed by the sensing circuitry 37.

In the above embodiment, the lighting device included a battery 17 for providing a backup or secondary power supply in the event of primary power supply failure. The battery can be of any technology, replaceable or non-replaceable and multiple batteries may be provided connected in series and/or in parallel. Each battery itself may comprise a single cell or multiple cells as appropriate to the battery technology. Where a multi cell battery is used, the charger may be arranged to monitor and charge each cell individually or groups of cells as desired. Alternatively, instead of using one or more batteries 17, other charge storage devices may be used to provide a secondary power supply, such as a capacitor. However, batteries are preferred since they can provide secondary power over a longer period of time. The secondary storage device is preferably mounted internal to the lighting device, but it can be mounted externally if desired. In one embodiment, the battery can be isolated from the electronic circuitry 19 so that the lighting device can only operate in its primary mode of operation. This may be done in response to a received user input or in response to detecting a battery fault or a fault in another system component.

In the above embodiment, the sensing circuitry 37 generated voltage pulses which it applied across the supply terminals 33 in order to measure the impedance across the supply terminals 33. In an alternative embodiment, the sensing circuitry 37 could include a current generator and could instead apply pulses of known current to one or both of the supply terminals 33 and could then measure the voltage across the supply terminals to determine a measure of the impedance between the supply terminals 33.

In the above embodiments, the light sources that were used in the lighting device 1 were LEDs. As those skilled in the art will appreciate, the use of LEDs is preferred given the ease with which they can be controlled (e.g. output intensity), their long expected operating life, rough handling ability and of particular advantage (given the battery-operation likelihood of the device) their low power consumption. However, the light sources can be formed from any lighting technology, such as compact fluorescent tubes, incandescent lighting (such as halogen lighting) etc.

In the above embodiment, the lighting device took the form of a normal look-a-like light bulb. However, the lighting device can also take the form of an elongate tube similar to the common fluorescent "strip light" variety.

In the above embodiment the battery is mounted within a cavity of a heat sink used to extract heat from the light sources. As those skilled in the art would appreciate, the mounting of the battery and the use of this particular heat sink is not essential. The battery may be mounted in any convenient location and the heat sink can have any desired form or can be omitted if desired. When the heatsink is provided, it may be formed from an electrically conductive material and coupled to a capacitive sensing circuit that can thus sense when a user touches or comes into close proximity to the heatsink. For example, the heatsink may include a one or more electrically conductive plates (which may also act as cooling fins) that are electrically connected to a charge measuring circuit. The measuring circuit can then determine a value based upon charge measurement techniques (well known to those skilled in the art), which value will change in the event that the capacitive field is interrupted or altered, such as by a user touching or entering a part of his or her body in the vicinity to the plates. This user input can be used, for example to control the operation of the lighting device, such as to control the operating modes or to control the brightness of the lamp in dependence upon a measured time that the user approaches or touches the heatsink. Other technologies may also be used to perform this proximity sensing, such as short range radar devices.

In the embodiment described above, the lighting device included diagnostic and communication circuitry. As those skilled in the art will appreciate, this circuitry is not essential and could be omitted if desired. Additionally, one or more user switches or inputs may be mounted on the lighting device. This user input can be used to cause the lighting device to enter a given mode of operation or to enter user configurations or to initiate a diagnostic or self-test.

In the above embodiment, the lighting device included a communications module 45 that was able to communicate with external devices using a communication transducer 25. In an alternative embodiment, the communications module 45 may be arranged to communicate with the external devices by receiving and/or transmitting signals over the lighting circuitry 28 in which the lighting device 1 is installed. Such communication signals would be transmitted at a different frequency to the mains signal in order that the communication signals can be separated from the mains signal. Instead of or in addition to using the communication transducer 25, the electronic circuitry 19 could communicate with one or more remote devices by varying the light produced by the light sources 7. For example switching them on and off in dependence upon the data to be transmitted. A receiver in the remote device would recover the data by detecting the variation in the light produced by the light source(s) 7. Regardless of the communication technique employed, various different standard communication protocols could be used for the communications between the lighting device and the remote device(s).

In the main embodiment described above, the electronic circuitry 19 included a diagnostic module 41 for performing diagnostic tests and for controlling diagnostic indicators 23 to indicate the diagnostic test results. As discussed, the diagnostic test could be used, for example, to determine the remaining charge capacity of the secondary power supply (e.g. the battery 17), which could be indicated via a coloured indicator 23 or pulse variations of an LED indicator 23. A problem with this arrangement is that when the lighting device 1 is producing useful light, this general illumination is likely to mask the visibility of the diagnostic indicator(s) 23. This problem can be overcome, however, by deploying the diagnostic indicator(s) 23 for a period of time shortly after the lighting device 1 stops producing useful light (for example when the lighting device transitions from its primary mode of operation into its dormant mode of operation). Alternatively the light array(s) may be partially or fully employed to act as an information indicator for diagnostic, status, fault, condition or other purposes. For example, the light generated by the light array(s) 11 could be pulsed depending on the remaining battery charge, as measured and controlled by the electronic circuitry 19. The user can optionally configure the way in which this is achieved by storing appropriate user configuration parameters within the electronic circuitry—for example using a remote control device that communicates with the device using the communication transducer 25.

In the above embodiment, a user was able to set various user configurable parameters of the lighting device 1 using the communication transducer 25 and a remote control device. Alternatively, the lighting device 1 may have an additional configuration or 'setup mode' that allows certain simple configurations to be defined, choices selected and changes saved upon exit, all via changes in the primary power supplied to the lighting device 1 made by the user opening and closing the user operable switches 26. For example, the electronic circuitry 19 may be arranged so that if the user switches the primary power supply to the lighting device 1 three times within 3 seconds, it will enter a setup mode, and one cycle within the next five seconds thereafter to select a specific option etc. Such a configuration technique would be simple and cheap to implement and would allow the user to select certain other control parameters defining the unit's operation. This can include, but is not limited to defining: emitter brightness in primary or secondary modes, and the change in illumination quantity during secondary mode over time or according to the electrical charge remaining in the secondary power supply etc.

In the above embodiment, the lighting device 1 had a number of light sources of the same type (in this case LEDs) arranged into two groups that were independently driveable by the electronic circuitry 19. FIG. 10 illustrates an alternative embodiment that has different types of light sources, each being of varying design, type, technology or the like. The general operation of this embodiment is the same, with the exception that the two or more types of light emitters may be advantageously utilised to achieve several improvements over the embodiment shown in FIG. 1. These improvements include, reduction in power consumption verses quality and quantity of light output, manufacturing cost, and built-in redundancy for an increased margin of safety or component lifespan. In particular, this arrangement allows light sources that are optimised for primary illumination to be used when the primary supply is present and allows light sources that are optimised for emergency lighting (requiring lower power to drive them) to be used when there is a power failure. Additional advantages of this multi-emitter approach include potential for extended product life and safety margins through built-in redundancy, particularly critical for emergency lighting systems, with scope for system separation within the electronic circuitry 19 in which the primary emitter remains for use only during primary mode.

In the embodiment shown in FIG. 10, the two different light sources comprise an LED array(s) 91 and a compact fluorescent tube 93 with associated ballast circuitry 95. Electronic control circuitry 19 is joined, by connection 97 (comprising typically two wires), to fitting 5 such that the primary supply may provide electrical power for operating the LED array(s) 91 and/or the compact fluorescent tube 93 in the primary mode, with the same connection 97 being utilised for impedance sensing to ascertain external circuit conditions as before. An appropriate secondary power supply (such as battery 17) can provide back-up power as before for powering at least the LED array(s) 91.

The electronic circuitry 19 may control combinations of the light sources 91 and/or 93, such as utilising compact fluorescent tube 93 for primary mode operation when the primary power supply is available (potentially augmented by light from the LED array 91), and utilising the LED array(s) 91 as the sole emitter during secondary mode when the primary power supply is interrupted and only the secondary power supply is available. In this embodiment, the compact fluorescent tube 93 may be powered directly by the AC primary supply in the primary mode of operation. This can be achieved by replacing the output driver 50 used for the fluorescent tube 93 with a relay switch that is directly connected between the primary input power terminals 33 and the fluorescent tube 93 and that is controlled by the processor 35 or the power supply unit 31.

In this embodiment, the electronic circuitry 19 may include circuitry to detect, for example, if the light source normally used for primary illumination is faulty or has failed. If so then the electronic circuitry 19 can use the other light source for primary illumination instead. The electronic circuitry 19 can detect such a failure either by measuring the impedance across the terminals of the light source (and inferring from this measure if the light source is operational) or using a photo-sensor that can detect if the light source is actually producing light or using current measurement techniques.

In the main embodiment discussed above, the lighting device 1 was a single unitary device. In alternative embodiments, some of the components and some of the functionality may be moved to another device which controls the powering of a lighting device (such as a conventional bulb). This may be achieved, for example, using an in-line adapter that sits between a conventional light bulb and the lamp holder. Such in-line adapter embodiments are illustrated in FIG. 11. As shown, the in-line adapter 101 sits between the primary power supply 103 and a conventional lighting device (or devices) 105. The in-line adapter 101 may be a readily interchangeable device such as the arrangement shown in FIG. 11a, or a permanent installation such as the example shown in FIG. 11b.

The in-line adapter 101 will typically have the same electronic circuitry 19 as in the first embodiment, enclosed within a suitable housing or casing 107. This can then be retrofitted to an existing lighting circuit by connecting the fitting 5-1 of the in-line adapter 101 into an appropriate vacant lamp holder 24 providing mechanical and electrical connection to the primary power supply 103. A plurality of lamps or lighting devices, shown here as a single conventional light bulb 105 having light fitting 5-2, mechanically and electrically interface with a lamp holder 109 that forms part of the in-line adapter 101.

During primary mode operation, a switching device 113 such as a mechanical or solid-state relay controllable by the electronic circuitry 19 allows power from the primary power supply from 103 to be routed to the lamp holder 109 for purposes of powering the light bulb 105. This switching device 113 may be controlled by the electronic circuitry 19, and is an important requirement specific to this in-line adapter embodiment, since the required impedance sensing technique for detecting external switch positions cannot be reliably performed when certain types of conventional light bulbs (ones having a low internal impedance) are connected across the primary supply terminals 103—as the presence of such a conventional low impedance light bulb may cause the sensing circuitry 37 to determine that the manually operable switches 26 are closed circuit when in fact they are open circuit. Thus, when impedance measurements are to be made, the switching device 113 is activated to disconnect the conventional light bulb 111 from the supply 103.

An additional feature that can be performed by the electronic circuitry 19 in this embodiment (because of the presence of the switching device 113) is that it can allow the illumination of the light sources 91 on the in-line adapter 101 during the primary mode without illuminating the conventional light bulb 105. This could be triggered by signals received from an external device such as from an external user-controlled remote controller, using the communication transducer 25 shown here for example conveniently integrated within the LED array 91.

The electronic circuitry 19 may also have the ability to detect the failure or removal of the light bulb 105 from the adapter 101, so that if the primary power supply is available to the in-line adapter 101, the electronic circuitry 19 can still provide useful illumination using the LED array 91 powered from the primary power supply. Sensing that the light bulb 105 has failed or been removed from the adapter 101 can be achieved by various methods, including measuring the electrical impedance across or current through terminals of the lamp holder 109. In particular, when the light bulb 105 has failed or been removed from the holder 109 there will be a high impedance across the terminals of the lamp holder 109. This high impedance can be detected by applying a test voltage across the input terminals of the lamp holder 109 (when the lamp holder 109 has been isolated from the rest of the primary supply 103 (using the switching device 113) and sensing the current drawn. Alternatively, a low current drawn by the lamp holder 109 when the primary supply 103 is supplied to the terminals of the lamp holder 109 is also indicative of a failed or removed light bulb 105. Such low current draw can be detected by measuring the voltage drop across a purposely included resistor (not shown) that is connected in series with the terminals of the lamp holder 109, or by using any other current sensing transducer.

Instead of using such an electrical detection method (for detecting a failed or removed light bulb 105), one or more light sensors may instead be employed to measure external ambient light levels. One such photo-sensitive semiconductor device 117 is shown in FIG. 11a, conveniently integrated within the LED array 11. This photo-sensitive semiconductor device 117 can be controlled and monitored by the electronic circuitry 19, and used to ascertain if light bulb 105 is producing useful illumination by way of monitoring the change in light levels before and after switching device 113 is activated to connect the lamp holder 109 to the primary power supply 103. If no appreciable increase in light level is observed then there is a high likelihood that light bulb 105 has failed or been removed from its holder 109.

Regardless of the detection method used, such a feature is desirable in mission critical deployments, and greatly increases the reliability and versatility of the in-line adapter 101 in its primary mode of operation. In particular, when the adapter 101 initially detects the failed lamp, it can automatically switch on the secondary light source(s) 11 to give the user a visual warning that the primary light bulb 105 has failed—even though the light is switched off at the switch 26. This initial warning can then be switched off by the user, for example, by switching the switch 26 on and off. Thereafter, every time the user switches on the switch 26, illumination will be provided by the secondary light source(s) until the primary light bulb 105 has been replaced. Further, the provision of backup emergency illumination when the light bulb 105 has failed or been removed provides light for the user when they are replacing the failed or removed light bulb 105.

The photo-sensitive semiconductor device 117 may additionally be utilised to perform other specialist functions as may be selected by the user, or pre-selected within preferences stored in memory of the electronic circuitry 19 via an external control device such as user-operable remote controller that communicates with the in-line adapter 101 via the communication transducer 25. Specialist functions could for example include the ability for the light bulb 105 and/or the LED array 91 to provide illumination from any available power supply for a predetermined time interval when ambient light levels have (prior to the provision of the illumination) been measured to fall below one or more threshold values over time.

An alternative embodiment of an in-line device 101' is illustrated in FIG. 11b, in which the in-line adapter 101' is incorporated in proximity to or within the ceiling rose forming the usual junction for electrical connection and mechanical suspension of a pendant light 111 (as shown), multiple lamp chandelier or the like. The operation of such as system remains the same as that outlined for FIG. 11a.

Thus light array 91 may provide more prominent illumination, in the secondary mode or otherwise, due to its advantageous positioning above that of the pendant light bulb 111. In this illustration, the light array 91 is formed from a plurality of individual LED emitters 9 arranged in multiple rings to utilise the additional space created by detachment of lamp holder 109 via the lighting cable 121. Furthermore, the aesthetic design constraints of such an in-line device 101' are harmonised since it may be at least partially housed in enclosures similar to existing hardware and or using conveniently available space voids, here shown partially located within the ceiling juncture 123.

The in-line device 101' shown in FIG. 11 b is designed to be installed on a more permanent basis. Therefore, fitting 5-1 has been replaced with a suitable electrical interface that enables electric wires or cable to be connected thereto. The example illustrated in FIG. 11 b shows such an arrangement, with a plurality of terminal blocks 125 housed within enclosure 127 which may or may not be integral to the main enclosure housing 107 of the in-line adapter 101'. If the enclosure 127 is separate from the main housing 107 of the in-line adapter 101', then an additional detachable interface may be included to interconnect components within enclosures 127 and 107. This yields the advantage of allowing convenient interchangeability of such a semi-permanent in-line embodiment, including the ability of the in-line adapter 101' to optionally retrofit an existing interface such as a pre-installed ceiling rose that permits straightforward interchange of various suspended lighting devices to be utilised without manual electrical installation. Further advantages include a greater accessibility to the main housing 107 allowing easier battery 17 replacement, and naturally the safety and time advantages in not having to make permanent electrical connections between the in-line device 101' and the primary power supply 103.

In the main embodiment described above, the electronic circuitry 19 used for controlling the lighting device was mounted within the housing of the lighting device itself. In an alternative embodiment, the electronic circuitry 19 used to control the light sources may be provided in a separate housing. Such an embodiment would allow the invention to be able to operate, for example, with conventional "low voltage" lamps. Such a conventional low voltage lamp typically comprises multiple low voltage light emitters forming a plurality of luminaries. These historically featured incandescent lamps, usually tungsten halogen technology, although retrofit LEDs in traditional lamp holders, such as the GU series holders, have been available in recent years. Such low voltage lighting systems typically utilise a supply potential difference below 50 volts (either AC or DC) provided by a power supply unit (PSU), which usually comprises a conventional transformer or switch mode power circuit. The PSU is typically fed by a mains power supply which it then converts and supplies for powering one or more lighting devices. Unfortunately, the lighting device 1 shown in FIG. 1 does not directly lend itself to retro-fitment into such a low voltage lighting system. Apart from the overall size of the lighting device 1, the main problem is that the PSU unit that powers the low voltage lighting will inhibit the usual impedance sensing performed by the sensing circuitry 37 because there is no direct connection to the primary power supply on the input side of the PSU. One workaround to this problem is to rearrange the wiring of the lighting circuit 28 such that any user operable switches are located on the output side of the PSU rather than on the input side. However, as well as the additional effort required to perform the rewiring, such an arrangement will also mean that the mains supply is constantly fed into the PSU input and this will invariably cause inefficiency due to heat losses associated with the PSU.

On the other hand, if the conventional low voltage PSU is replaced by a modified PSU that contains at least the main components of the electronic circuitry 19 shown in FIG. 3, then this will overcome these problems. Such an embodiment is schematically illustrated in FIG. 12. As shown, the electronic circuitry 19 is mounted in a separate housing 131 that can be placed anywhere on the lighting circuit 28 so that the sensing circuit 37 can sense the impedance across the primary power supply terminals 33. In this case, the housing 131 also includes a secondary power supply in the form of a battery 17. The output terminal(s) 49 and/or 51 (shown in FIG. 3) from the electronic circuitry 19 are then directly connected to the conventional low voltage lamp holder(s) 133 and thus the low voltage lights 134 will be powered either by power derived from the primary supply and/or from power derived from the secondary supply (the battery 17 in this example). In such an embodiment, the secondary power supply (such as the battery) may be mounted in the same housing 131 as the electronic circuitry 19 or it may be provided separately, for example, within a loft or ceiling space and connected to the electronic circuitry 19 at terminals 34. The secondary power source may provide power directly to the low voltage lights or through a voltage-transforming PSU or the like (not shown).

The housing 131 may include additional output terminals 49 that receive converted supply signals in the usual way (i.e. converted from the AC mains voltage to the required DC supply voltage)—so that lights attached to these additional output terminals do not receive emergency power from the battery back-up in the event of a primary supply failure. In this way, the modified PSU 131 may control a number of lamp holders 133, but may only provide emergency lighting to a subset of those lamp holders.

Instead of the light source(s) being directly connected to the output terminals 49 of the electronic circuitry 19 in housing 131, the electronic circuitry 19 may transmit control signals using a communication transducer 25 to the lighting device(s) to instruct them to power their light source(s) using secondary power from its own secondary power supply (such as its own battery). FIG. 13 illustrates such an embodiment. As before, the communication transducer 25 can be of any type—such as electromagnetic (e.g. RF or infra-red) or acoustic. Control signals transmitted from the electronic circuitry 19 in the housing 131 would be received by a corresponding communications transducer 25 mounted in the lighting device 1. In this embodiment, the electronic circuitry 135 mounted in the lighting device 1 does not need to have the sensing circuitry 37. It only needs communication circuitry 45—to be able to communicate with the electronic circuitry 19 mounted in the remote housing 131; a power supply unit 31—for controlling the application of power either from the primary supply or from the lighting device's own associated secondary power supply 17 and the appropriate output driver(s) 50 or relays. As those skilled in the art will appreciate, communication between the lighting device 1 and the circuitry in the housing 131 may be two way—so that, for example, the lighting device 1 can acknowledge receipt of control signals back to the circuitry within housing 131. Such two way communication also allows remote testing of the lighting device 1, for diagnostic or self test purposes without the need for physical contact. For example, the control signals may instruct the lighting device 1 to perform a self test and to output diagnostic results via the diagnostic indicator 8 or to transmit the results back to the circuitry in the housing 131. The information transmitted back to the housing 131 may also include operation statistics for the lighting device 1—such as time periods between being in its different operating modes, measured impedance values etc.

The housing 131 may also include a user interface (keypad, display switches etc.) that allows a user to enter control commands, user configurations etc., for controlling the lighting devices 1 with which the circuitry in the housing 131 is arranged to communicate.

Instead of transmitting the control signals over a wireless link, the electronic circuitry 19 mounted in the housing 131 may transmit the control signals over the mains supply lines to the lighting device(s) 1. In this case, if any of the manually operable switches 26 are open circuit, the lighting device 1 will not receive the control signal. But this does not matter as the user is not expecting the emergency lighting to come on when the manually operable switches 26 are open circuit. Once the switches 26 are closed, the lighting device 1 will receive the control signal (which may be continuously or intermittently transmitted by the circuitry in the housing 131) and thus turn on its emergency lighting using power from its secondary power supply.

As a further alternative, the circuitry in the housing 131 could be arranged to transmit a control signal whilst the primary supply is present at its input and to stop transmitting the control signal if there is a power failure. In such an embodiment, the circuitry in housing 131 would not need its own secondary power supply 17. As long as the lighting devices 1 receive the control signals from the circuitry in the housing 131, they will know that primary power is available (although perhaps switched off at a user operable switch 26). If the lighting device 1 stops receiving the control signal, then it can assume that primary power has been lost and it can either directly illuminate its light source(s) from its secondary power supply or it can first try to sense if any of the user operable switches 26 are open circuit first, before using power from the secondary power supply (of course in this case, the electronic circuitry 135 in the lighting device would require the sensing circuitry 37).

As a further alternative to this embodiment, the electronic circuitry 19 mounted in the housing 131 does not need to sense the impedance across the supply lines. If the housing 131 is mounted close to the main fuses or circuit breakers 22 of the building, then the circuitry in the housing can detect the power failure simply by sensing if there is any mains power.

If mains power is lost, then the circuitry in the housing 131 can signal the loss of power to the lighting device(s) 1. Advantageously, this can be signalled over the lighting circuit 28—so that if the switches 26 are open circuit, the control signal will not reach the lighting device 1 and so they will not produce their emergency lighting. However, if the switches 26 are closed, then they will receive the control signal and can automatically switch on their light source(s) using power from the secondary supply.

In one embodiment, local or national control centres may be provided to control the lighting devices 1 in different buildings. For example, control signals may be sent to lighting devices 1 in order to inhibit their operation—for example by disconnecting their light sources from the primary supply terminals 33 using an appropriate isolating device such as a relay. Thus, even if the user switches on the light switch, the lighting device 1 will not produce light. This could be used, for example, to switch off lights in a building at night. Conversely, one or more lighting devices may be remotely controlled to switch on in order to illuminate a given area. These remote control devices may be stand alone devices or they may be part of a larger system—such as an alarm system. For example, in the event that a fire is detected in a building, the lighting devices 1 in that part of the building may be remotely controlled to switch on—to provide emergency illumination to aid occupant escape or search and rescue. As those skilled in the art will appreciate, in any such system involving communication between a number of different devices, they will each need an address or ID number to allow communications to be targeted to individual lighting devices 1 or at least to individual groups of lighting devices. Of course signals for all devices may be transmitted without an address—such as an "emergency" signal to cause all the emergency lighting to come on.

Optionally, one or more detection devices (e.g. smoke or fire detection) may be provided integrally within the lighting device 1 or adjacent to it and they may use the same primary power supply or secondary power supply to operate. In such an embodiment, the secondary power source (such as a battery) may be partitioned in its deployment, for example through intelligent monitoring to inhibit battery use for emergency lighting when the battery capacity falls below a threshold capacity; in order to maintain a reserve store of power to allow continued operation of the built-in detection device(s) and in the event of detection, the provision of emergency illumination from the battery for an adequate time before the battery becomes completely exhausted. In this way, if there is a power failure, the charge in the secondary supply will not be depleted such that emergency lighting cannot still be provided during critical emergency situations—such as when a fire is detected. In such an embodiment, the lighting device 1 may include an optical or acoustic receiver that detects when the fire or smoke alarm is activated and in turn it may activate its emergency lighting functionality. Alternatively, the lighting device 1 may be signaled to activate via an electrical control signal directly from the alarm or from a central alarm station.

The lighting device 1 may also include an audible emitter for producing an audible alarm in the event of an emergency that is able to augment emergency illumination when a signal has been received and or an emergency condition detected. The audible alarm may be powered by either primary or secondary power sources according to user configurable parameters.

Optionally, the alarm may also augment emergency illumination when a power failure or other defined event has occurred. For example, an audible sound may be generated upon change of operating state, or when certain operating conditions (such as low battery or a device fault) are detected. The alarm may intermittently or continuously provide the user with an audible indication of the state or condition that triggered the alarm. This arrangement could be particularly advantageous for example to alert the user that a power failure has occurred when the lighting device has entered its secondary mode of operation, in an embodiment where the lighting device is arranged to provide emergency illumination that is of equal brightness compared to the illumination when powered by the primary supply (which failure may otherwise go unnoticed). The alarm could additionally be used to provide audible warning of low battery status such as after prolonged secondary mode operation.

In a modified embodiment, as well as the user being able to control brightness level during secondary mode operation, a minimum duration of light emission may be set or preset (via remote, communications module or upon manufacture) and the power used by the lighting device may be controlled by reducing light source brightness (with an optional minimum brightness level set or preset) according to estimated or measured battery capacity (as determined from the above described diagnostic methods), to ensure a minimum time period of secondary light production. With lighting regulations in mind (3 hours minimum in UK for emergency lighting) such a method could improve efficiency, optionally varying brightness over time to give the best compromise between brightness and duration according to accurate battery capacity estimations. Such battery capacity predictions determined using measured discharge data will of course take into account degradation over time and use.

The diagnostic tests described in the first embodiment may also be implemented to verify functionality and or performance of other system elements, such as light source(s) 7 or individual emitters 9 or arrays 11 thereof. For example, the light sensor 117 shown in the in-line adaptor embodiment in FIG. 11 could be employed to ascertain that collectively the light emitters are performing to a required standard or threshold. Measured values may alternatively be analysed and employed for purposes of brightness adjustment or optional feedback thereof by light source driver(s).

In a modified embodiment, as well as brightness levels produced by light source(s) 7 being a changeable parameter adjustable via processor 35 through output driver 50 control or otherwise, optionally the colour temperature of the light produced by light source(s) 7 may also be varied. This can be achieved by various methods such as for an LED light source, changing the brightness of individual light emitters 11 and/or arrays 9 wherein arrays or LEDs therein have different colour temperatures, thus allowing variance of the overall colour temperature of light emitted from light source (7) within the lighting device 1. Such a variance could be advantageously utilised to allow control of the quality of light produced, such as achieving a preference of subtle colour temperature (e.g. warm white verses cool white light) or allowing a full 'RGB' colour range for mood or atmospheric lighting purposes. Such control could be implemented by the user, such as through a remote control device via communications module 45 or otherwise, or optionally by the processor itself for strategic purposes such as to form a visual diagnostic system that may replace or augment diagnostic module 41.

In the above embodiments, the lighting device 1 had a pair of primary supply terminals for connection to a primary supply, such as a mains supply circuit. In addition, another (separate) pair of terminals may be provided on the lighting device for connecting the lighting device to another power source. This other power source may be, for example, from a renewable energy source such as a photovoltaic cell or a wind turbine or the like. The power received from this additional AC or DC supply may be used to light the light sources and/or to charge the battery 17 via optional additional power supply control and management circuitry internal or external to the lighting device.

The invention claimed is:

1. A lighting device comprising:
   one or more light sources;
   a primary input power connection for receiving primary power from a primary power supply, for powering at least one of the one or more light sources;
   a secondary input power connection for receiving secondary power from a secondary power supply, for powering at least one of the one or more light sources; and
   electronic circuitry coupled to the input power connections and arranged to control power delivery to at least one of the one or more light sources using power received at the input power connections;
   wherein the electronic circuitry comprises sensing circuitry connected to the primary input power connection and configured to sense an external impedance connected to the primary input power connection and an isolator for isolating the sensing circuitry from other components of the lighting device, the other components of the lighting device being electrically connected to the primary input power connection and presenting a low impedance across the primary input power connection at least when said sensing circuitry is sensing said external impedance.

2. A lighting device according to claim 1, wherein the isolator comprises a semiconductor junction device isolating said sensing circuitry from the other components of said electronic circuitry.

3. A lighting device according to claim 2, wherein said semiconductor junction device comprises a zener diode.

4. A lighting device according to claim 2, wherein the semiconductor junction device is coupled to the primary input power connection and is connected to the sensing circuitry such that the semiconductor junction device is reverse biased when said sensing circuitry is sensing the external impedance connected to the primary input power connection.

5. A lighting device according to claim 2, wherein the sensing circuitry is arranged to apply a measurement voltage to the primary input power connection and wherein an amplitude of the measurement voltage is lower than a breakdown voltage of the semiconductor junction device.

6. A lighting device according to claim 1, wherein the isolator comprises a transformer.

7. A lighting device according to claim 1, wherein said isolator comprises a relay device isolating one or more of said light sources from the sensing circuitry.

* * * * *